US008270035B2

(12) United States Patent
Tabata et al.

(10) Patent No.: US 8,270,035 B2
(45) Date of Patent: Sep. 18, 2012

(54) IMAGE FORMING DEVICE FORMING A VISIBLE IMAGE ON A MEDIUM CONTAINING DETECTABLE SUBSTANCES

(75) Inventors: Shinji Tabata, Ashigarakami-gun (JP); Shinji Sasahara, Ashigarakami-gun (JP)

(73) Assignee: Fuji Xerox Co., Ltd, Tokyo (JP)

( * ) Notice: Subject to any disclaimer, the term of this patent is extended or adjusted under 35 U.S.C. 154(b) by 600 days.

(21) Appl. No.: 12/183,681

(22) Filed: Jul. 31, 2008

(65) Prior Publication Data

US 2009/0091799 A1 Apr. 9, 2009

(30) Foreign Application Priority Data

Oct. 9, 2007 (JP) ................................ 2007-263386

(51) Int. Cl.
*H04N 1/40* (2006.01)

(52) U.S. Cl. ....... 358/3.28; 358/1.9; 358/1.13; 358/501; 358/504

(58) Field of Classification Search ........................ None
See application file for complete search history.

(56) References Cited

U.S. PATENT DOCUMENTS

| | | | | |
|---|---|---|---|---|
| 4,652,015 | A * | 3/1987 | Crane | 283/91 |
| 5,974,150 | A * | 10/1999 | Kaish et al. | 713/179 |
| 6,025,603 | A * | 2/2000 | Hasegawa et al. | 250/556 |
| 6,651,894 | B2 | 11/2003 | Hattori et al. | |
| 6,893,788 | B2 | 5/2005 | Takagi et al. | |
| 6,979,827 | B2 * | 12/2005 | Walker | 250/461.1 |
| 7,497,379 | B2 * | 3/2009 | Chen et al. | 235/454 |
| 7,878,398 | B2 * | 2/2011 | Chen et al. | 235/454 |
| 7,900,837 | B2 * | 3/2011 | Sinclair et al. | 235/462.01 |
| 2003/0030271 | A1 * | 2/2003 | Wicker | 283/113 |
| 2004/0041030 | A1 * | 3/2004 | Nimura et al. | 235/468 |

FOREIGN PATENT DOCUMENTS

| | | |
|---|---|---|
| JP | A-7-256101 | 10/1995 |
| JP | A-09-120456 | 5/1997 |
| JP | A-09-226227 | 9/1997 |
| JP | B1-2893336 | 5/1999 |
| JP | A-2001-265183 | 9/2001 |
| JP | A-2002-120475 | 4/2002 |
| JP | A-2002-240387 | 8/2002 |
| JP | A-2003-186238 | 7/2003 |

(Continued)

OTHER PUBLICATIONS

Feb. 2, 2010 Office Action issued in Japanese Patent Application No. 2007-263386 (with translation).

*Primary Examiner* — Chan S. Park
*Assistant Examiner* — Dung Tran
(74) *Attorney, Agent, or Firm* — Oliff & Berridge, PLC

(57) ABSTRACT

An image processing device includes a generating unit and an output unit. The generating unit generates image data on the basis of which an image forming unit forms a visible image on a recording medium containing detectable substances using only a coloring material having a spectral reflection factor that is different in a particular wavelength range from a spectral reflection factor that the detectable substances have by a predetermined threshold or more. The output unit outputs the image data generated by the generating unit to the image forming unit.

14 Claims, 18 Drawing Sheets
(1 of 18 Drawing Sheet(s) Filed in Color)

FOREIGN PATENT DOCUMENTS

| | | |
|---|---|---|
| JP | A-2004-142175 | 5/2004 |
| JP | A-2004-285524 | 10/2004 |
| JP | A-2005-38389 | 2/2005 |
| JP | A-2006-267707 | 10/2006 |
| JP | A-2006-268549 | 10/2006 |
| JP | A-2007-179510 | 7/2007 |

* cited by examiner

241

| PAPER SHEET ID | TOTAL NUMBER OF DETECTABLE SUBSTANCES | SUB-TOTAL NUMBER OF DETECTABLE SUBSTANCES PER AREA | | | | | | | | | SUB-TOTAL NUMBER SORTED BY NUMBERS OF OVERLAPPING DETECTABLE SUBSTANCES | | | SUB-TOTAL NUMBER OF DETECTABLE SUBSTANCES PER ANGULAR RANGE | | | |
|---|---|---|---|---|---|---|---|---|---|---|---|---|---|---|---|---|---|
| | | F1 | F2 | F3 | F4 | F5 | F6 | F7 | F8 | F9 | ONE | TWO | 3 OR MORE | R1 | R2 | R3 | R4 |
| 1 | 8 | 0 | 1 | 1 | 0 | 0 | 2 | 1 | 2 | 1 | 6 | 1 | 1 | 8 | 0 | 0 | 0 |
| 2 | 11 | 1 | 3 | 0 | 1 | 2 | 1 | 0 | 3 | 0 | 9 | 2 | 0 | 9 | 1 | 1 | 0 |
| 3 | 12 | 0 | 1 | 2 | 0 | 3 | 0 | 1 | 3 | 2 | 10 | 1 | 1 | 2 | 3 | 6 | 1 |
| 4 | 7 | 0 | 2 | 0 | 1 | 1 | 0 | 0 | 0 | 3 | 2 | 3 | 2 | 0 | 5 | 1 | 1 |
| 5 | 13 | 1 | 4 | 2 | 0 | 3 | 2 | 0 | 1 | 0 | 8 | 5 | 0 | 1 | 8 | 2 | 2 |
| 6 | 10 | 3 | 2 | 0 | 1 | 1 | 0 | 0 | 1 | 2 | 6 | 3 | 1 | 2 | 0 | 5 | 3 |
| 7 | 10 | 0 | 0 | 2 | 0 | 2 | 0 | 3 | 2 | 1 | 8 | 0 | 2 | 2 | 2 | 3 | 3 |
| 8 | 9 | 3 | 0 | 0 | 2 | 0 | 0 | 2 | 0 | 2 | 9 | 0 | 0 | 3 | 2 | 3 | 1 |
| 9 | 10 | 0 | 1 | 1 | 1 | 3 | 0 | 1 | 2 | 1 | 7 | 2 | 1 | 3 | 2 | 1 | 4 |
| 10 | 14 | 5 | 0 | 1 | 0 | 0 | 3 | 0 | 2 | 3 | 8 | 3 | 3 | 1 | 5 | 3 | 5 |

242

| PAPER SHEET ID | IMAGE FORMING DATE/TIME | DEVICE ID | FILE ID | PAGE NUMBER | USER ID | TAKE-OUT AVAILABILITY |
|---|---|---|---|---|---|---|
| 1 | 2006.11.25 | 1 | File 1 | 1 | A | INHIBITED |
| 2 | 2006.11.27 | 1 | File 2 | 1 | A | INHIBITED |
| 3 | 2006.11.27 | 1 | File 3 | 1 | B | ALLOWED |
| 4 | 2006.11.27 | 1 | File 3 | 2 | B | ALLOWED |
| 5 | 2006.11.27 | 1 | File 3 | 3 | B | ALLOWED |
| 6 | 2006.11.28 | 1 | File 4 | 1 | A | INHIBITED |
| 7 | 2006.11.28 | 1 | File 4 | 2 | A | INHIBITED |
| 8 | 2006.11.29 | 2 | File 5 | 1 | C | ALLOWED |
| 9 | 2006.11.30 | 2 | File 6 | 1 | D | INHIBITED |
| 10 | 2006.11.30 | 2 | File 7 | 1 | B | ALLOWED |

| OBJECT | LENGTH | PERIPHERAL LENGTH | AREA SIZE | CENTROID (X) | CENTROID (Y) | ANGLE |
|---|---|---|---|---|---|---|
| A | 650 | 2215 | 41895 | 2546 | 899 | 172 |
| B | 595 | 1250 | 21015 | 4118 | 1356 | 143 |
| C | 612 | 1322 | 22078 | 987 | 3882 | 158 |
| D | 620 | 1292 | 21977 | 2408 | 2609 | 58 |
| E | 603 | 1185 | 21850 | 1939 | 4003 | 32 |
| F | 720 | 2180 | 43096 | 2764 | 3978 | 176 |
| G | 625 | 1305 | 22606 | 908 | 5441 | 27 |
| H | 840 | 3286 | 61874 | 2618 | 5603 | 33 |
| I | 597 | 1237 | 20885 | 2217 | 6740 | 76 |
| J | 590 | 1221 | 21698 | 3868 | 6659 | 123 |

| OBJECT | LENGTH | PERIPHERAL LENGTH | AREA SIZE | CENTROID (X) | CENTROID (Y) | ANGLE | AREA | NUMBER OF OVERLAPPING DETECTABLE SUBSTANCES | ANGULAR RANGE |
|---|---|---|---|---|---|---|---|---|---|
| A | 650 | 2215 | 41895 | 2546 | 899 | 172 | F2 | 2 | R4 |
| B | 595 | 1250 | 21015 | 4118 | 1356 | 143 | F3 | 1 | R4 |
| C | 612 | 1322 | 22078 | 987 | 3882 | 158 | F4 | 1 | R4 |
| D | 620 | 1292 | 21977 | 2408 | 2609 | 58 | F5 | 1 | R2 |
| E | 603 | 1185 | 21850 | 1939 | 4003 | 32 | F5 | 1 | R1 |
| F | 720 | 2180 | 43096 | 2764 | 3978 | 176 | F5 | 2 | R4 |
| G | 625 | 1305 | 22606 | 908 | 5441 | 27 | F7 | 1 | R1 |
| H | 840 | 3286 | 61874 | 2618 | 5603 | 33 | F8 | 3 | R1 |
| I | 597 | 1237 | 20885 | 2217 | 6740 | 76 | F8 | 1 | R2 |
| J | 590 | 1221 | 21698 | 3868 | 6659 | 123 | F9 | 1 | R3 |

| TOTAL NUMBER OF REFERENCE OBJECTS | SUB-TOTAL NUMBER OF REFERENCE OBJECTS PER AREA | | | | | | | | | SUB-TOTAL NUMBER SORTED BY NUMBERS OF OVERLAPPING REFERENCE OBJECTS | | | SUB-TOTAL NUMBER OF REFERENCE OBJECTS PER ANGULAR RANGE | | | |
|---|---|---|---|---|---|---|---|---|---|---|---|---|---|---|---|---|
| | AREA F1 | AREA F2 | AREA F3 | AREA F4 | AREA F5 | AREA F6 | AREA F7 | AREA F8 | AREA F9 | 1 | 2 | 3 OR MORE | ANGULAR RANGE R1 | ANGULAR RANGE R2 | ANGULAR RANGE R3 | ANGULAR RANGE R4 |
| 10 | 0 | 1 | 1 | 1 | 3 | 0 | 1 | 2 | 1 | 7 | 2 | 1 | 3 | 2 | 1 | 4 |

| | TOTAL NUMBER OF DETECTABLE SUBSTANCES | AREA | | | | | | | | | SUB-TOTAL NUMBER OF OVERLAPPING DETECTABLE SUBSTANCES | | | ANGULAR RANGE | | | |
|---|---|---|---|---|---|---|---|---|---|---|---|---|---|---|---|---|---|
| FRONT | – | F1 | F2 | F3 | F4 | F5 | F6 | F7 | F8 | F9 | – | – | – | R1 | R2 | R3 | R4 |
| BACK | – | F3 | F2 | F1 | F6 | F5 | F4 | F9 | F8 | F7 | – | – | – | R4 | R3 | R2 | R1 |

FRONT

BACK

FRONT

BACK

IMAGE FORMING DEVICE FORMING A VISIBLE IMAGE ON A MEDIUM CONTAINING DETECTABLE SUBSTANCES

CROSS-REFERENCE TO RELATED APPLICATIONS

This application is based on and claims priority under 35 USC 119 from Japanese Patent Application No. 2007-263386 filed on Oct. 9, 2007.

BACKGROUND

Technical Field

The present invention relates to an image processing device, an image forming device, an image reading system, a comparison system, an image processing method, computer readable medium, and computer data signal.

SUMMARY

An aspect of the present invention provides an image processing device including: a generating unit that generates image data on the basis of which an image forming unit forms a visible image on a recording medium containing detectable substances using only a coloring material having a spectral reflection factor that is different in a particular wavelength range from a spectral reflection factor that the detectable substances have by a predetermined threshold or more; and an output unit that outputs the image data generated by the generating unit to the image forming unit.

BRIEF DESCRIPTION OF THE DRAWINGS

The patent application file contains at least one drawing executed in color. Copies of this patent or patent application publication with color drawings will be provided by the Office upon request and payment of the necessary fee.

Exemplary embodiments of the present invention will now be described in detail below with reference to the following figures, wherein.

DETAILED DESCRIPTION

Hereinafter, exemplary embodiments of the invention will be described with reference to the drawings.

A. First Exemplary Embodiment

1. Structure

Figure 1:
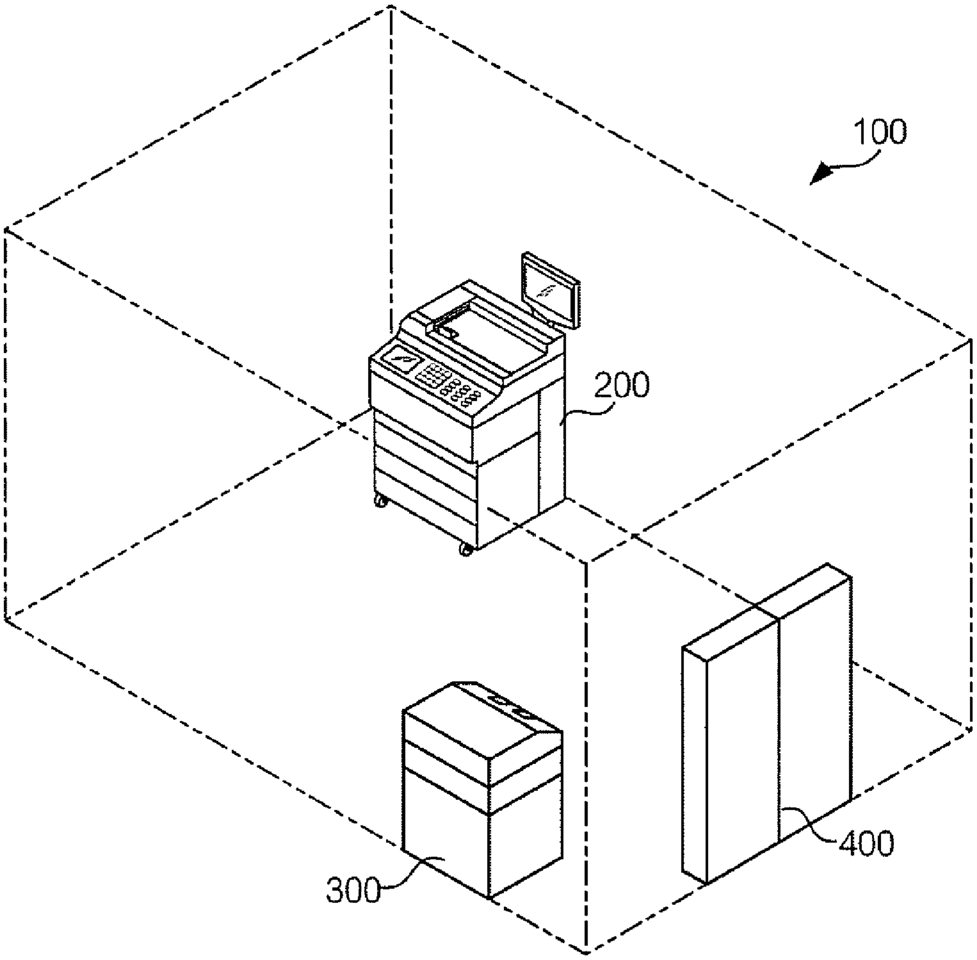
FIG. 1 is a perspective view showing an entire structure of a comparison system 100.

FIG. 1 is a perspective view showing an entire structure of a comparison system 100 according to an exemplary embodiment of the invention. As shown in FIG. 1, the comparison system 100 has a registration device 200, a comparison device 300, and an openable/closable door 400. This comparison system 100 is set in a space limited to a predetermined area, such as a room in a building of an enterprise or a school. In this limited space, there are plural sheet-type recording media (hereinafter "printed materials") on which visible images are formed. Take-out of some of the printed materials is inhibited, i.e., some of the printed materials are for internal use only. The base of each printed material is a white paper sheet, and one or plural metal detectable substances are watermarked in advance in the paper sheet. The registration device 200 is an image forming device according to an electrophotographic system, and forms a visible image specified by a user on the paper sheet. The registration device 200 optically reads the paper sheet (recording medium), and calculates and stores feature amounts characterizing distribution of detectable substances watermarked in the paper sheet. The comparison device 300 is, for example, a scanner device which optically reads images from a printed material (recording medium), and is placed near the door 400. The door 400 is usually closed and open/close is controlled by a door open/close unit 401 described later.

Now, a case where a user takes a printed material outside through the door 400 will be described. The user operates the comparison device 300 so as to read the printed material. The comparison device 300 reads the printed material and calculates feature amounts characterizing distribution of detectable substances watermarked in the printed material. The comparison device 300 and the registration device 200 are connected wirelessly or by a cable to enable communication with each other. The comparison device 300 compares the feature amounts calculated by the comparison device 300 with feature amounts characterizing distribution of detectable substances, which are stored in the registration device 200. The comparison device 300 outputs a comparison result. At this time, if the comparison result satisfies a predetermined condition and if the printed material is not an item for internal use only, the comparison device 300 opens the door 400. Otherwise, if the comparison result does not satisfy the predetermined condition or if the printed material is for internal use only, the comparison device 300 inhibits opening of the door 400. The aforementioned predetermined condition is determined depending on correlation between feature amounts characterizing distributions to be compared with each other (such as a number of equal feature amounts or a value of equal feature amounts). For example, if calculated feature amounts characterizing distribution of detectable substances agree with stored feature amounts characterizing distribution of detectable substances at a rate of 80% or more, these detectable substances are regarded to be identical to each other. As an alternative example, the predetermined condition is that a difference between compared values of compared feature amounts is 5% or less. The door 400 is not limited to an openable/closable door but may be a gate constituted of panels attached on two sides of a gateway which users can pass through at any time. In this case, for example, an emergency bell or siren is set in a security guard room not shown outside the gate or the limited space, and take-out of a printed material may be notified by sounds or light in place of closing the door.

Figure 2:
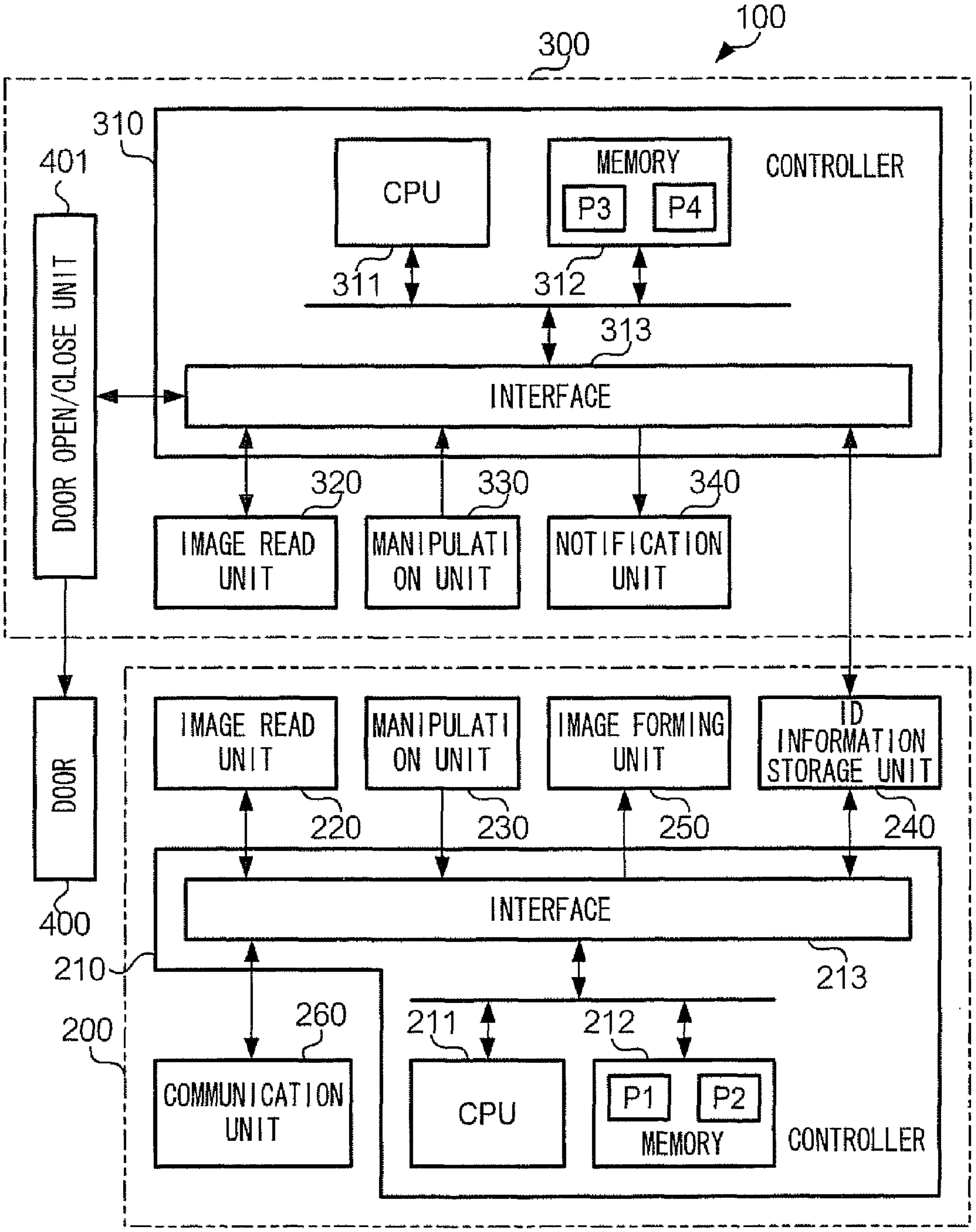
FIG. 2 is a block diagram showing functional configurations of a registration device and a comparison device.

FIG. 2 is a block diagram showing functional configurations of the registration device 200 and the comparison device 300. As shown in FIG. 2, the registration device 200 is an image forming device which includes a controller 210, an image read unit 220, a manipulation unit 230, an ID information storage unit 240, an image forming unit 250, and a communication unit 260. The controller 210 controls operations of the image read unit 220 and the image forming unit 250, and executes predetermined image processings on image information obtained from the image read unit 220. The image read unit 220 optically reads a paper sheet watermarked with detectable substances, and generates image information expressing the watermarked detectable substances. The image read unit 220 further supplies the controller 210 with the image information. The manipulation unit 230 has an input device such as a keyboard or manipulators such as buttons. The manipulation unit 230 receives manipulations made by a user, and generates and supplies control signals indicating the manipulations to the controller 210. The communication unit 260 receives image information, which is used to form an image, from an external device connected through a communication cable, for example. The controller 210 supplies the image forming unit 250 with the image information, to form a visible image on a paper sheet.

More specifically, the controller 210 has a CPU (Central Processing Unit) 211, a memory 212, and an interface 213. The CPU 211 executes programs stored in the memory 212. For example, the memory 212 includes a ROM (Read Only Memory) which stores various programs, and a RAM (Random Access Memory) which functions as a work area for the CPU 211. The interface 213 is a physical interface which enables exchange of information with individual units connected to the controller 210. The interface 213 receives various information from the image read unit 220 and the manipulation unit 230, and supplies the image read unit 220 with various information.

Programs stored in the memory 212 are a basic program P1 for controlling operation of the registration device 200, and a feature amount calculation program P2 for calculating feature amounts which characterize distribution of a detectable substance. Processings performed by the feature amount calculation program P2 will be described in detail later.

Next, the image forming unit 250 will be described below. The image forming unit 250 includes image forming engines.

The image forming engines are respectively provided for individual developers containing toners (coloring materials) of different colors: cyan (C), magenta (M), yellow (Y), and black (K). Each of the image forming engines includes a photosensitive drum, an electric charge unit, an exposure unit, a development unit, and a transfer unit. The black toner (hereinafter "K toner") utilizes a pigment as a coloring material, and contains a carbon black. Toners of the other colors also utilize pigments of corresponding colors, respectively. The photosensitive drums each are a drum type member which rotates at a predetermined speed about an axle as a rotation center. The photosensitive drums are charged to an electric potential by the electric charge units, respectively. The exposure units irradiate the electrically charged photosensitive drums with laser light, to form electrostatic latent images, respectively. The development units supply toners of corresponding colors so as to stick to the electrostatic latent images formed on the photosensitive drums, respectively, and develop the latent images to attain toner images, also respectively. The transfer units respectively transfer the toner images of corresponding colors to a paper sheet which is fed from a sheet feed tray in synchronization with forming of an image. After fixing the toner images on the paper sheet, the paper sheet is output outside of the device.

The image read unit 220 is provided in an upstream side relative to the transfer units of the image forming unit 250 along a sheet feed direction. Before the toner images are transferred by the transfer units, the image read unit 220 optically reads the paper sheet fed from the sheet feed tray.

Figure 3:
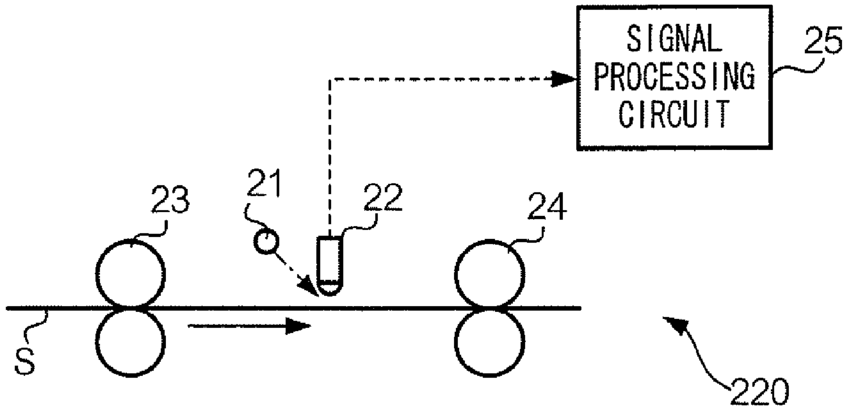
FIG. 3 illustrates a structure of an image read unit 220.

Specifically, the image read unit 220 has a structure as shown in FIG. 3. As shown in FIG. 3, the image read unit 220 has a light source 21, a sensor 22, transport rolls 23 and 24, and a signal processing circuit 25. The light source 21 is, for example, a fluorescent lamp and emits light to a position where the sensor 22 picks up an image. The sensor 22 is a CCD (Charge Coupled Device) image sensor of a contact type. The sensor 22 receives reflection light which is emitted from the light source 21 and reflected by a paper sheet S, and generates an image signal indicating density of the reflection light. The transport rolls 23 and 24 are roll members which transport the paper sheet S in an arrow direction in the figure. The signal processing circuit 25 performs a signal processing such as AD conversion on the image signal supplied from the sensor 22, i.e., converts the analogue image signal into digital image information and outputs the digital image information. The light source 21, sensor 22, and paper sheet S each have a finite width in a direction vertical to the paper face of FIG. 3. This direction will be referred to as an "X direction". Further, a direction, which is perpendicular to the X direction and corresponds to the arrow direction in FIG. 3, will be hereinafter referred to as a "Y direction".

The size of image information and the number of grey-scales can be arbitrarily determined. In this exemplary embodiment, an area of A4 size (210 mm×297 mm) is read at an input resolution of 600 dots (pixels) per inch, to obtain data in which each dot indicates 8-bit grey-scale (of total number of 256 grey-scales). At this time, grey-scale values (luminance information) are defined so that a grey-scale value "0" corresponds to white and a grey-scale value "255" corresponds to black. The lower the grey-scale value is, the higher the brightness is. The higher the grey-scale value is, the lower the brightness is. In the image information, an image area covers an entire surface of a paper sheet. That is, the image area of image information is an array of 4960 (≈210×600/25.4) pixels in the X direction×7016 (≈297×600/25.4).

The ID information storage unit 240 stores an ID information management table 241 and a property information management table 242.

Figures 4, 18:
FIG. 4 shows an example of an ID information management table.
FIG. 18 illustrates numbers of overlapping detectable substances.

FIG. 4 shows an example of the ID information management table 241. In the ID information management table 241, each "paper sheet ID" as identification information for a paper sheet is associated with feature amounts characterizing distribution of detectable substances watermarked in the paper sheet. The feature amounts characterizing distribution of detectable substances are information indicating how detectable substances watermarked in a paper sheet are distributed. For example, as shown in FIG. 4) the feature amounts include values classified in fields "total number of detectable substances", "sub-total number of detectable substances per area", "sub-total number sorted by numbers of overlapping detectable substances", and "sub-total number of detectable substances per angular range". A total number of detectable substances read from each paper sheet is written into the field "total number of detectable substances". A number of detectable substances included in each of the areas "F1" to "F9" forming each paper sheet is written in the field "sub-total number of detectable substances per area". Sub-total numbers sorted by numbers of overlapping detectable substances, which appear as overlapping one another when viewed from a direction vertical to the paper sheet, are sorted and written into subsidiary fields "1", "2", and "3 or more". A number of isolated detectable substances each causing no overlap is sorted and written into the subsidiary field "1". A number of objects each consisting of two overlapping detectable substances is sorted and written into the subsidiary field "2". A number of objects each consisting of three or more overlapping detectable substances is sorted and written into the subsidiary field "3 or more". Written in the field "sub-total of detectable substances per angular range" are numbers of detectable substances, which respectively belong to angular ranges R1 to R4. Detectable substances are classified into the angular ranges R1 to R4, depending on angles of extending directions of the detectable substances to a predetermined direction relative to a surface of the paper sheet. All of the foregoing numbers relating to detectable substances are values obtained on the basis of image parts, which form part of an entire image read from a paper sheet and are respectively determined to correspond to detectable substances. Content of each of the foregoing fields and a specific process for obtaining the content will be described in more detail later.

Figures 5, 6:
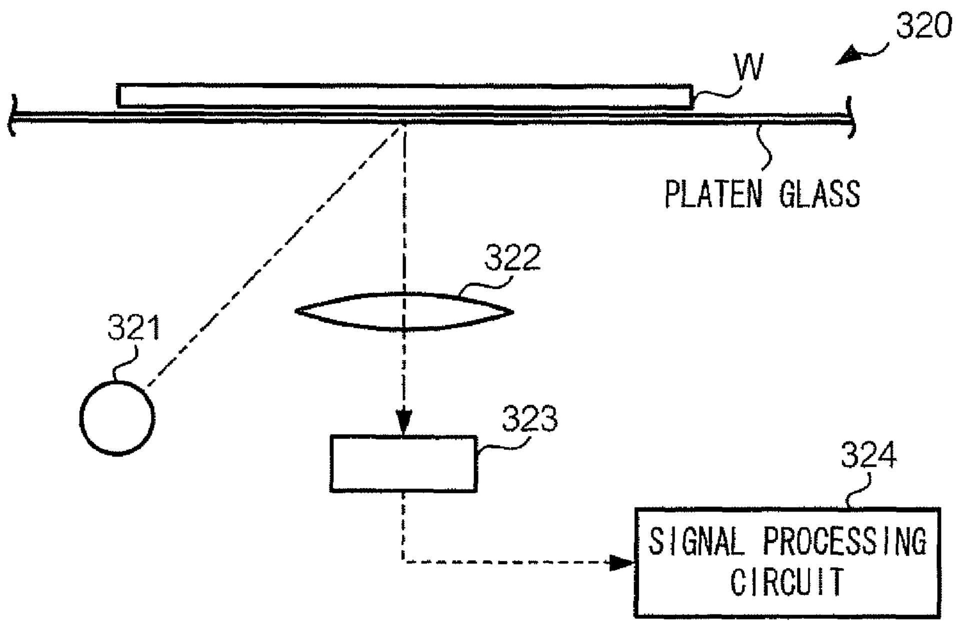
FIG. 5 shows an example of a property information management table.
FIG. 6 illustrates a structure of an image read unit 320.

Next, FIG. 5 shows an example of the property information management table 242. As shown in FIG. 5, in the property information management table 242, each "paper sheet ID" as identification information of a paper sheet is associated with an "image forming date/time", a "device ID", a "file ID", a "page number", a "user ID", and "take-out availability". A date/time when a visible image was formed on an associated paper sheet is written in the field "image forming date/time". Identification information (ID) assigned to the registration device 200 which formed visible images on an associated paper sheet is written in the field "device ID". Identification information specifying image information to be formed on an associated paper sheet is written in the field "file ID". A page number assigned to associated image information is written in the field "page number". Identification information of a user who instructed the image forming device to form an associated visible image is written in the field "user ID". Written in the field "take-out availability" is whether or not take-out of a paper sheet assigned with paper sheet Identification information to outside of the limited space is allowed.

As shown in FIGS. 4 and 5, feature amounts characterizing distribution of detectable substances and property information of visible images are associated with paper sheet IDs. In other words, in the ID information storage unit 240, feature amounts characterizing distribution of detectable substances are stored associated with property information of visible images.

Referring back to FIG. 2, the structure of the comparison device 300 will now be described below.

As shown in FIG. 2, the comparison device 300 according to this exemplary embodiment is an image read device which includes a controller 310, an image read unit 320, a manipulation unit 330, a notification unit 340, and a door open/close unit 401. The controller 310 controls operation of the image read unit 320, and executes a predetermined image processing on image information obtained by the image read unit 320. The image read unit 320 optically reads a paper sheet, and generates image information expressing an image read from the paper sheet. The image read unit 320 supplies the controller 310 with the image information. The manipulation unit 330 has an input device such as a keyboard or manipulators such as buttons. The manipulation unit 330 receives manipulations made by a user, generates control signals indicating the manipulations, and supplies the controller 310 with the control signals. The notification unit 340 has a liquid crystal display and/or a loudspeaker, and notifies the user of various information by outputting image signals and/or audio signals supplied from the controller 310. The door open/close unit 401 controls the door 400 to open/close, depending on feature amounts characterizing distribution of detectable substances, under control of the controller 310.

The controller 310 has a CPU 311, a memory 312, and an interface 313. The CPU 311 executes programs stored in the memory 312. For example, the memory 212 includes a ROM (Read Only Memory) which stores various programs, and a RAM (Random Access Memory) which functions as a work area for the CPU 311. The interface 313 is a physical interface which enables exchange of information with individual units connected to the controller 310. The interface 313 obtains various information from the image read unit 320 and the manipulation unit 330. The programs stored in the memory 312 are a basic program P3 for controlling operation of the comparison device 300, and a feature amount calculation/comparison program P4 for calculating feature amounts characterizing distribution of detectable substances and for making a comparison. Processings performed by the feature amount calculation/comparison program P4 will be described in detail later.

FIG. 6 shows a device structure of the image read unit 320. As shown in FIG. 6, the image read unit 320 includes an infrared light source 321, an imaging lens 322, a sensor 323, and a signal processing circuit 324. The infrared light source 321 is a LED (Light Emitting Diode) light source and emits light at a predetermined incident angle to a printed material W placed on a platen glass. The imaging lens 322 focuses reflection light from the printed material W at a position of the sensor 323 to form an image at this position. The sensor 323 has an image pickup element which is sensitive to light having wavelengths in an infrared range. The image pickup element receives the focused reflection light mentioned above, and the sensor 323 generates and outputs an image signal in accordance with intensity of the reflection light. The signal processing circuit 324 executes a signal processing such as an AD conversion on the image signal supplied from the sensor 323, e.g., converts an analogue image signal into digital image information and outputs the digital image information.

Figure 7:
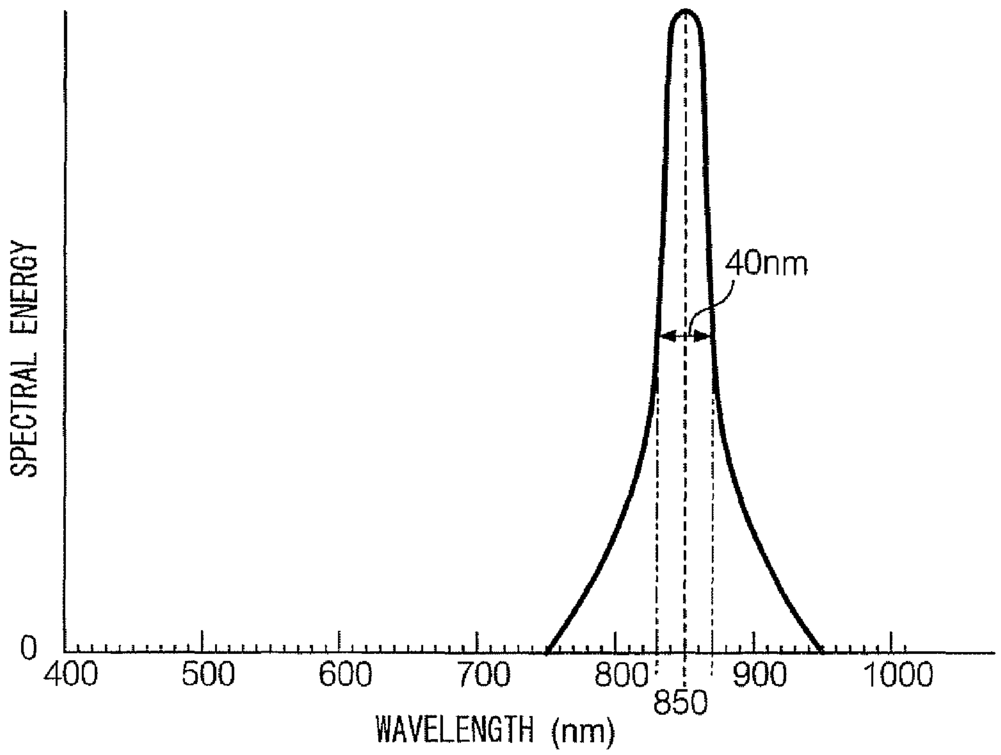
FIG. 7 is a graph schematically showing spectral energy distribution of an infrared light source.

FIG. 7 is a graph schematically showing spectral energy distribution of light emitted from the infrared light source 321. As shown in FIG. 7, the light emitted from the infrared light source 321 has spectral energy which is distributed in a range of approximately 750 nm to 950 nm (hereinafter referred to as an "infrared range") and peaks at approximately 850 nm. This light has a half-value width of approximately 40 nm. The infrared light source 321 having such spectral energy distribution as shown in FIG. 7 is used as the light source in the image read unit 320, on the ground as follows. Owing to such spectral energy distribution, image parts respectively corresponding to detectable substances (hereinafter referred to as detectable substance images) can be easily separated from a visible image as a result of reading an entire surface of a paper sheet on which the visible image is formed of C, M, and Y toners.

The image read unit 320 reads an area of A4 size (210 mm×297 mm) at input resolution of 600 dots (pixels) per inch, and generates image information of "256" grey-scales. The greater a grey-scale value of a pixel in the image information is, the lower (i.e., darker) the brightness of the pixel is. The smaller a grey-scale value of a pixel in the image information is, the higher (i.e, brighter) the brightness of the pixel is.

Figure 8:
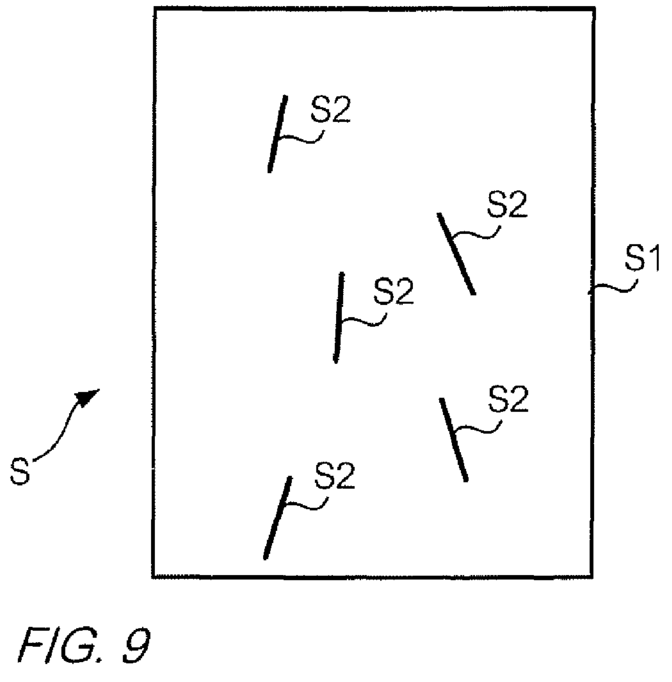
FIG. 8 shows an example of a paper sheet.
Figure 9:
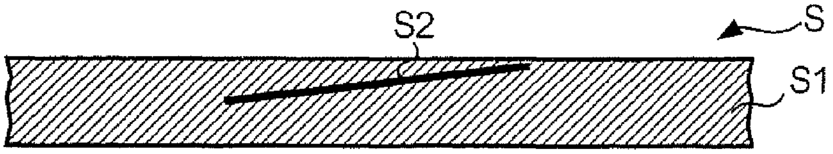
FIG. 9 shows another example of a paper sheet.

Referring to FIGS. 8 and 9, a structure of a paper sheet will now be described. As shown in FIG. 8, a paper sheet S is a sheet type material in which detectable substances S2 are embedded in a base material S1. The base material S1 is the same as that of ordinary paper sheets. The base material S1 contains, for example, cellulose as an ingredient. The detectable substances S2 each are a metal fiber which has a composition of Fe—Co—Si, and are embedded (or contained) in the base material S1 so as to watermark the base material S1. Each detectable substance S2 is also a substantially straight stick-like member, and has a length of approximately 25 mm and a diameter of approximately 30 μm. Several to fifty detectable substances S2 are embedded in the entire paper sheet S. In this exemplary embodiment, each detectable substance S2 has a light reflection factor which is lower than that of the base material S1. The diameter of each detectable substance S2 is smaller than the thickness of the paper sheet S. Therefore, when the paper sheet S is held up to light, positions and shapes of the detectable substances S2 can be seen through to some extent.

FIG. 9 shows a cross section of a paper sheet S, as an example of a state in which a detectable substance S2 is embedded in the base material S1. For example, as shown in FIG. 9, a detectable substance is embedded in the paper sheet S so that the entire detectable substance may not protrude out of surfaces of the paper sheet S. If the detectable substance S2 is embedded substantially in parallel to surface planes of the paper sheet S, the entire detectable substance S2 looks uniform in density. Otherwise, if the detectable substance S2 is embedded inclined to the surface planes of the paper sheet S, the detectable substance S2 does not look uniform in density but looks gradually lighter (or darker) toward one end.

2. Operation

Descriptions will now be made of content of processings executed by the comparison system 100, separately depending on whether the processings belong to operation of the registration device 200 or comparison device 300.

2-1. Operation of the Registration Device 200

Figure 10:
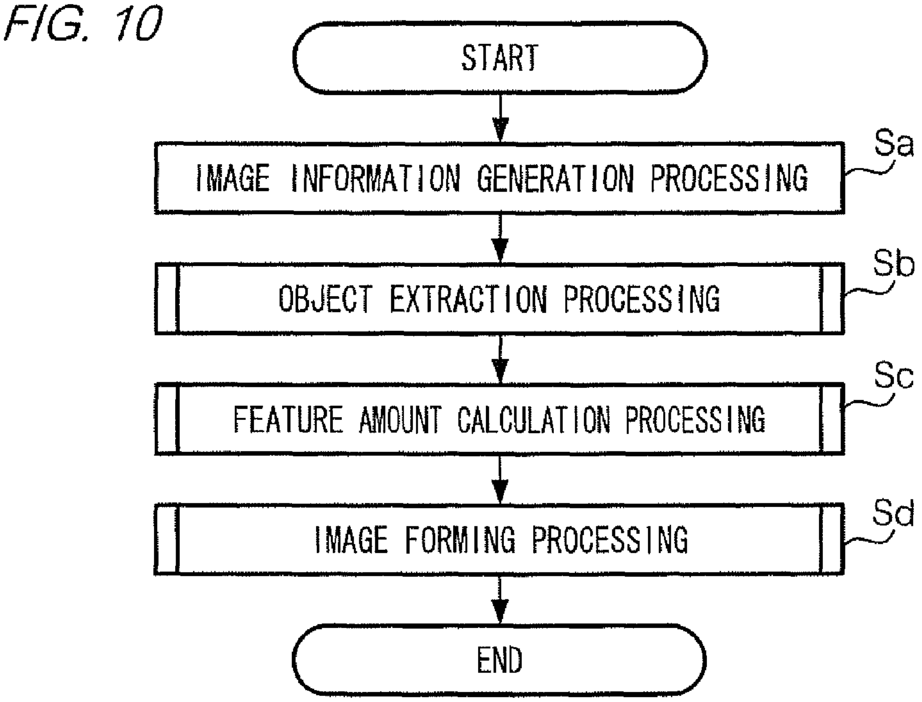
FIG. 10 is a flowchart showing operation of a controller of the registration device.

FIG. 10 is a flowchart showing an outline of processings executed when the feature amount calculation program P2 is executed by the controller 210. The feature amount calculation program P2 is executed when a user makes a manipulation (e.g., presses down a button) for forming a visible image on a paper sheet and a control signal associated with the manipulation is received by the controller 210.

In FIG. 10, the controller 210 of the registration device 200 firstly causes the image read unit 220 to read the paper sheet, and obtains image information generated by the image read unit 220 through the interface 213 (step Sa). Next, the controller 210 extracts detectable substance images, which respectively correspond to detectable substances, from the image information (step Sb). Subsequently, the controller 210 calculates feature amounts characterizing distribution of the detectable substances in the paper sheet (step Sc). Further, the controller 210 causes the image forming unit 250 to form a visible image in accordance with the obtained image information (step Sd).

The steps Sb, Sc, and Sd will now be described in detail below.

Object Extraction Processing

Figure 11:
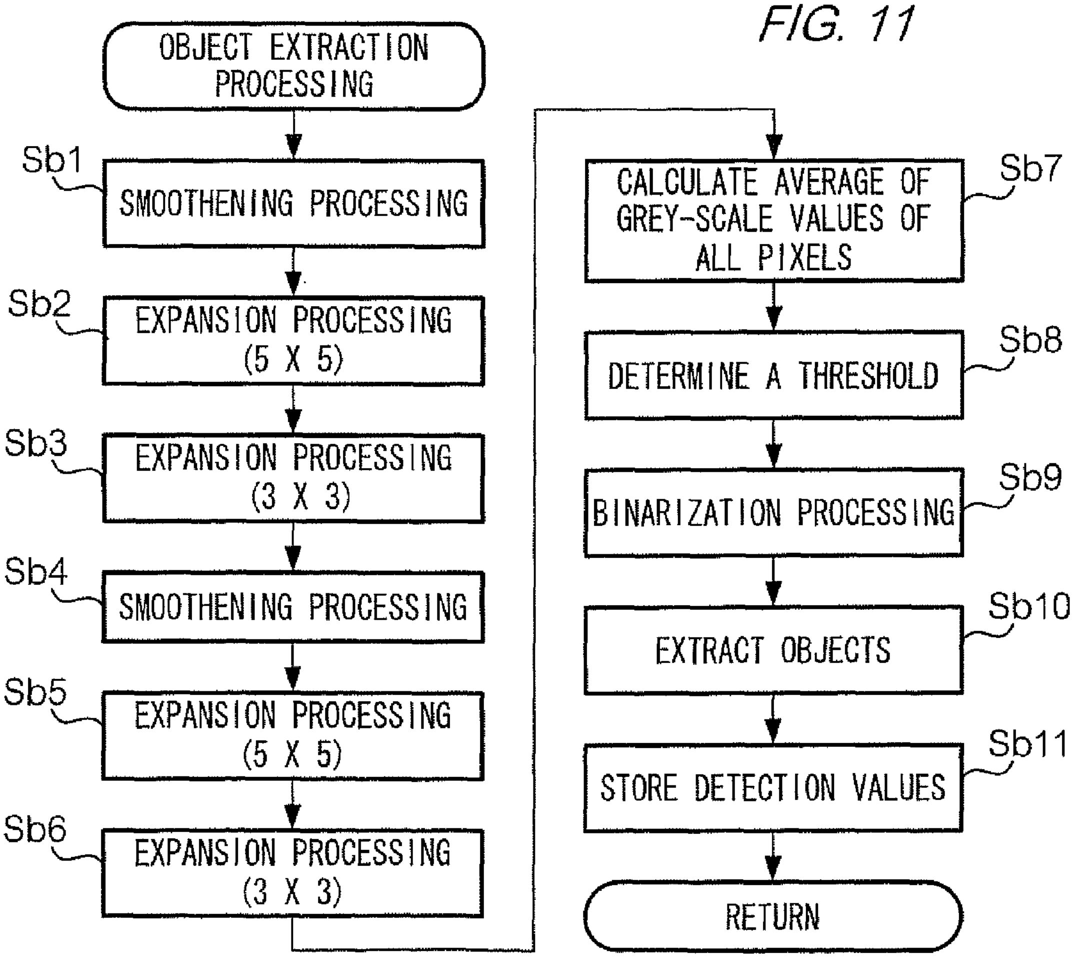
FIG. 11 is a flowchart showing an object extraction processing executed by the controller of the registration device.

FIG. 11 is a flowchart showing an object extraction processing in the step Sb.

In FIG. 11, the controller 210 firstly executes a smoothening processing on the image information generated by the image read unit 220 (step Sb1). This processing is to reduce nonuniformity in density in a base material part of the generated image information, and is performed by, for example, applying a smoothening filter of a predetermined size. Subsequently, the controller 210 executes an expansion processing (step Sb2) on the image information. This processing is to emphasize parts where detectable substances are embedded. Specifically, this processing is performed focused on pixels (hereinafter referred to as neighboring pixels) which exist in the vicinity of a target pixel. If a grey-scale value of even one of the neighboring pixels is greater than (i.e., darker) than a grey-scale value of the target pixel, the grey-scale value of the target pixel is substituted with the greater grey-scale value of one of the neighboring pixels.

Figure 12A:
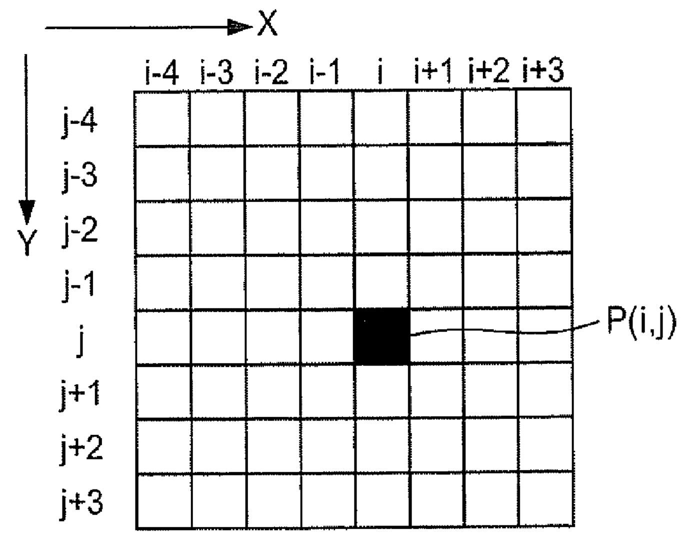
FIGS. 12A, 12B, and 12C illustrate an expansion processing.
Figure 12B:
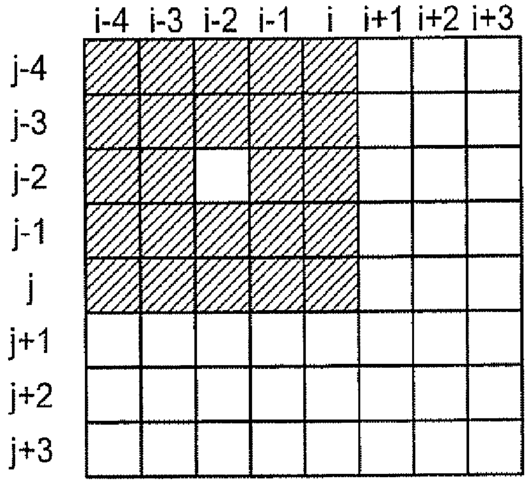
Figure 12C:
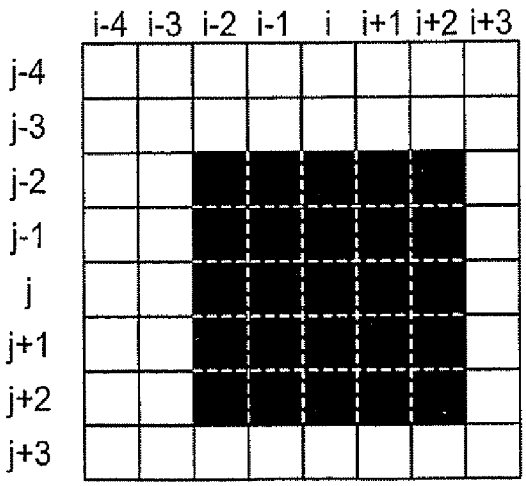

The expansion processing will now be described referring to a specific example. For example, an image information having a pixel P(i, j) as shown in FIG. 12A will now be taken into consideration. The parameter i represents a coordinate value in the X direction, and the parameter j represents a coordinate value in the Y direction. For convenience of explanation, the pixel P is supposed to have a grey-scale value "1" and all the other pixels are supposed to have a grey-scale value "0". Such image information is subjected to the expansion processing, focused on neighboring pixels which exist within two lines on each of upper, lower, left, and right sides of a target pixel. Where the pixel P(i−2, j−2) is a target pixel, the neighboring pixels are shown as hatched pixels in FIG. 12B. That is, the neighboring pixels are 24 pixels of P(i−4, j−4) to P(i, j−4), P(i−4, j−3) to P(i, j−3), P(i−4, j−2) to P(i−3, j−2), P(i−1, j−2) to P(i, j−2), P(i−4, j−1) to P(i, j−1), P(i−4, j) to P(i, j). At this time, the neighboring pixels include the pixel P(i, j), and therefore, the Grey-scale value "0" of the target pixel P(i−2, j−2) is substituted with "1". This expansion processing is performed on each pixel, to obtain a processing result as shown in FIG. 12C in which the grey-scale values in the vicinity of the pixel P(i, j) are all "1".

In the expansion processing as described above, the number of neighboring pixels can be any arbitrary number. For example, neighboring pixels may be pixels in one line on each of upper, lower, left, and right sides of a target pixel, in place of pixels in two lines on each of the four sides of a target pixel as in the foregoing example. Hereinafter, the expansion processing performed on neighboring pixels existing in two lines on each of upper, lower, left, and right sides of a target pixel will be referred to as a "5×5 pixel expansion processing", in the meaning of focusing on 5×5 pixels about a target pixel as a center. Similarly, an expansion processing performed on neighboring pixels existing in one line on each of upper, lower, left, and right sides of a target pixel will be referred to as a "3×3 pixel expansion processing", in the meaning of focusing on 3×3 pixels about a target pixel as a center. That is, the expansion processing executed in the step Sb2 is the 5×5 pixel expansion processing.

Returning to the description of the flowchart of FIG. 11, the controller 210 executes another expansion processing after execution of the expansion processing in the step Sb2 (step Sb3). The expansion processing executed in this step Sb3 is a 3×3 expansion processing. Subsequently, the controller 210 repeats the smoothening processing and the expansion processings executed in the steps Sb1, Sb2, and Sb3 in this order (steps Sb4, Sb5, and Sb6).

Next, the controller 210 calculates an average of grey-scale values of all pixels constituting the image information (step Sb7). Based on the average calculated at this time, the controller 210 determines a threshold T for a binarization processing to be performed later (step Sb8). Any arbitrary relationship can be made between the threshold T and the average. For example, the threshold T can be a value obtained by multiplying the average by a predetermined coefficient. In this operation example, the threshold T is a value obtained by adding "22" to the average.

Further, the controller 210 executes a binarization processing by using the threshold T as determined in a manner described above (step Sb9). That is, the controller 210 carries out a substitution so that all grey-scale values of pixels that are smaller than the threshold T are set to "0" and all grey-scale values of pixels that are not smaller than the threshold T are set to "1".

After executing the binarization processing, the controller 210 executes a processing for extracting objects, based on image information binarized through the binarization processing (step Sb10). In this processing, for example, labeling is carried out with regard to one object for each cluster of continuous pixels which have a gradation value "1". In addition, a length, a peripheral length, and an area size of each object are calculated. If the length, peripheral length, and area size of an object do not reach predetermined thresholds, the object is regarded and excluded as noise, e.g., as an object which has been extracted due to warp of a paper sheet or nonuniformity of light. In this example, the predetermined thresholds for the length, peripheral length, and area size of an object are respectively set to "236", "600", and "7000". These thresholds are expressed in units of "pixels". Specifically, the threshold for the length is approximately 10 (≈236/600×25.4) mm. Hereinafter, where the term "object" (except detectable substances) is used, the term refers to an object extracted in the step Sb10 but does not refer to noise appearing in image information.

Figures 13, 14:
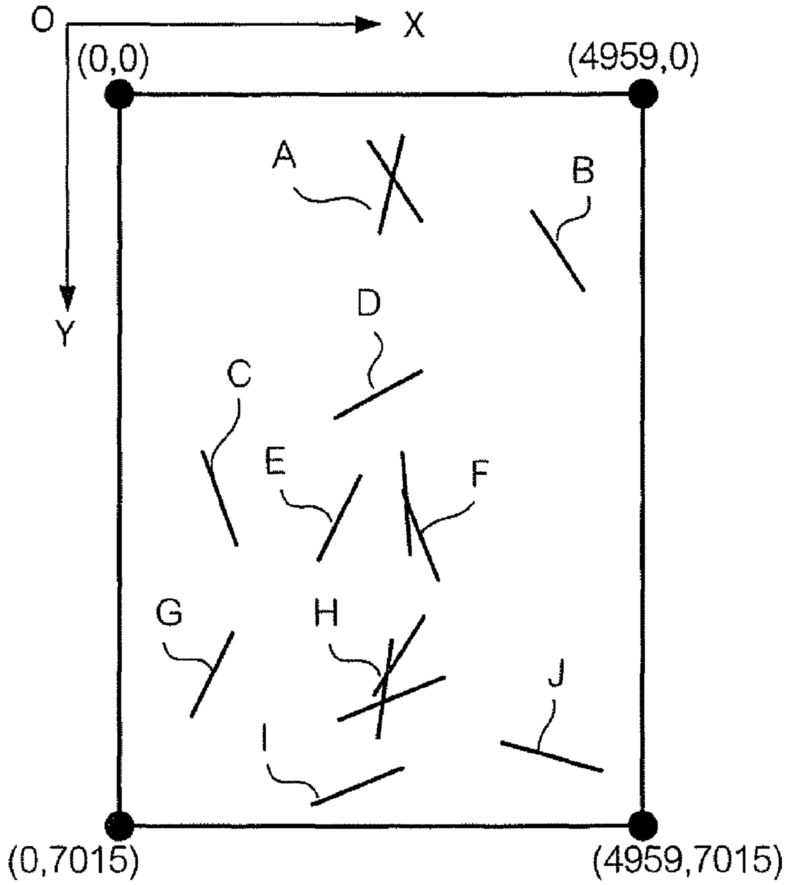
FIG. 13 shows an example of an image to which objects belong.
FIG. 14 shows detection values calculated by the controller of the registration device.

FIG. 13 shows a state of objects extracted from image information. References A to J are identification information for identifying the objects, respectively. The controller 210 sets X and Y coordinate axes with reference to a predetermined origin O, for the image information. In this case, the upper left corner of an image area is set as the origin O. Coordinate values on this coordinate system correspond to pixels, respectively. The X coordinate takes values of "0" to "4959" while the Y coordinate takes values of "0" to "7015". The controller 210 calculates a length, a peripheral length, an area size, a centroid, and an angle for each of the objects, and stores, into the memory 212, calculated results as detection values for each of the objects (step Sb11). FIG. 14 shows detection values which the controller 210 calculated for each of the objects in case of the image information shown in FIG. 13. The term "angle" refers to an angle between a predetermined direction (which is the direction of the Y coordinate axis in this exemplary embodiment) and a lengthwise direction of an object (in which the detectable substance extends). The "angle" is expressed in units of "degrees". Further, the length, peripheral length, and area size are expressed in units of "pixels".

Feature Amount Calculation Processing

Next, the feature amount calculation processing in the step Sc in FIG. 10 will be described in detail. This processing is to calculate feature amounts characterizing distribution of each detectable substance embedded in a paper sheet, from detection values which have been stored into the memory by the object extraction processing described above.

Figure 15:
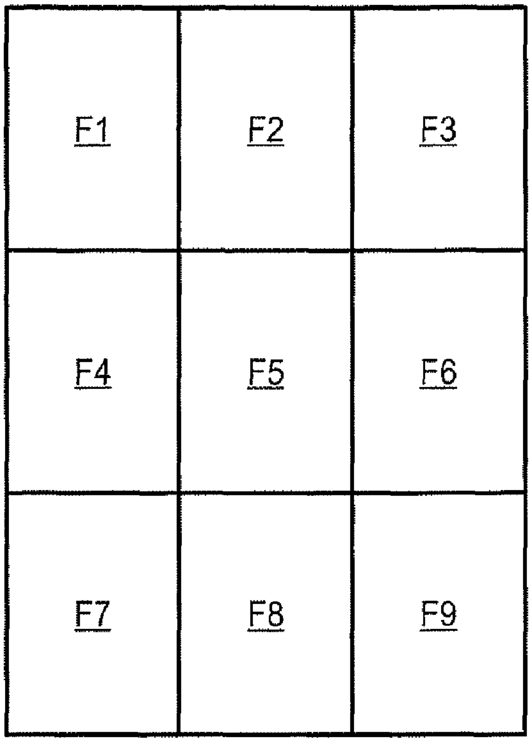
FIG. 15 shows a method of dividing an image area.
Figure 16:
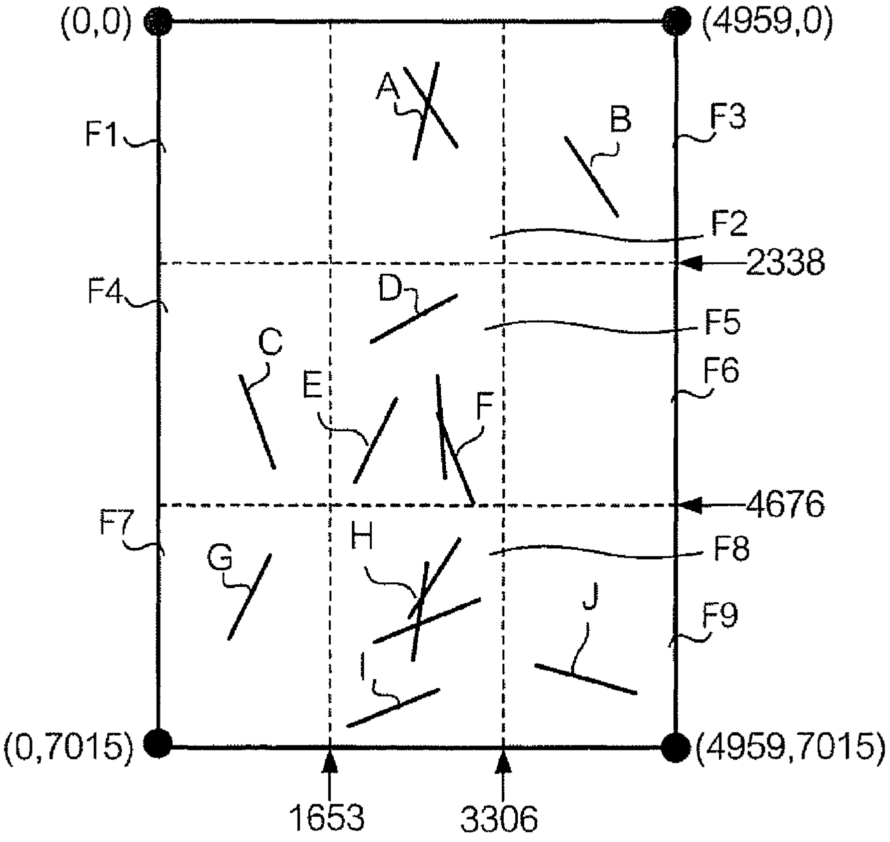
FIG. 16 shows an example of images divided from an image area.

In the feature amount calculation processing, the controller 210 divides an image expressed by image information, into plural images (hereinafter "divisional image areas"), and calculates feature amounts characterizing distribution of detectable substances for each of the divisional image area. Specifically, as shown in FIG. 15, the controller 210 divides an entire image area into a total of nine divisional image areas F1 to F9 arranged in a matrix of 3×3. FIG. 16 shows a result of dividing the image shown in FIG. 13 into such divisional image areas F1 to F9. At this time, lines expressed by X=2338, X=4676, Y=1653, and Y=3306 are boundaries which separate adjacent divisional image areas.

Figure 17:
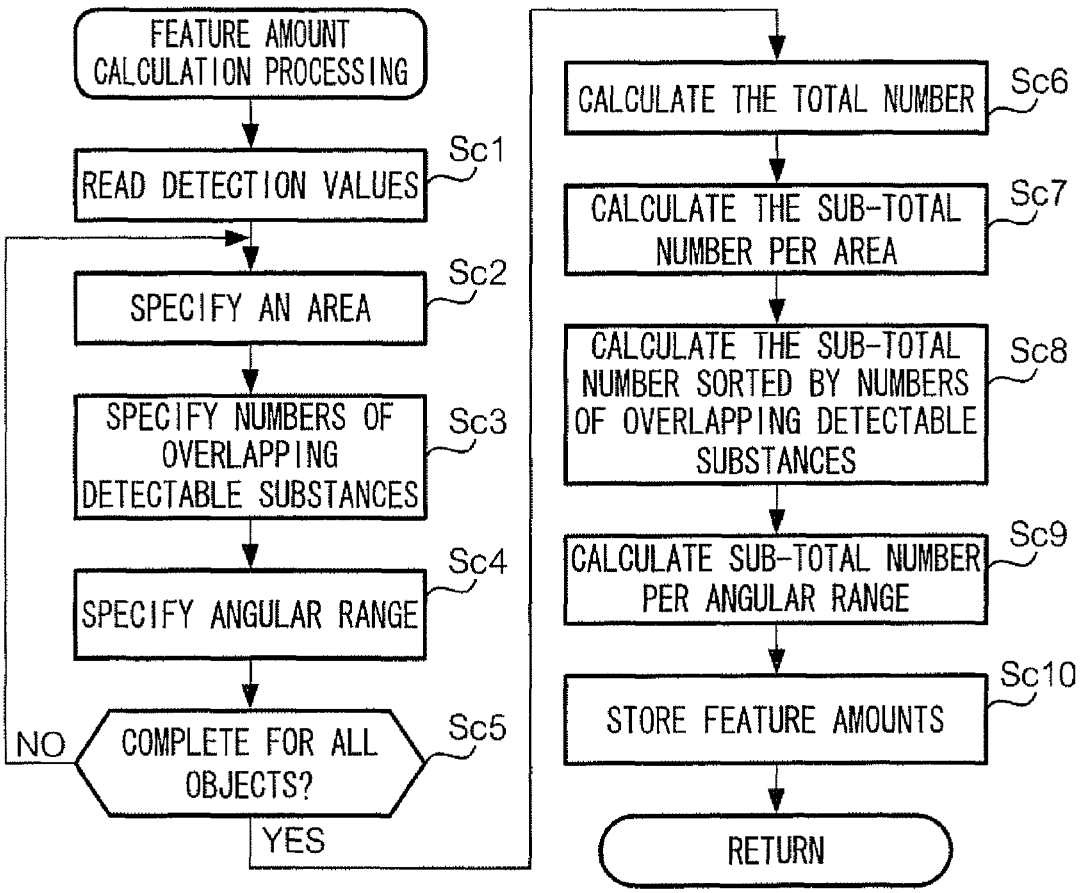
FIG. 17 is a flowchart showing a feature amount calculation program executed by the controller of the registration device.

FIG. 17 is a flowchart showing the feature amount calculation processing in the step Sc. The following description will be made along with the flowchart. At first, the controller 210 reads detection values concerning objects, which are stored in the memory 212 (step Sc1). Subsequently, the controller 210 calculates features characterizing distribution of detectable substances, for each of the objects.

At first, focusing on an object as a target, the controller 210 specifies which of the divisional image areas F1 to F9 the object belongs to (step Sc2). In this case, coordinate values of a centroid of each object are compared with coordinate values which define each divisional image area. A divisional image area to which the centroid of an object belongs is specified as the divisional image area to which the object belongs. In the example of FIG. 16, for example, the objects A, B, and C are specified as belonging to the divisional image areas F2, F3, and F4, respectively.

Next, the controller 210 specifies numbers of overlapping detectable substances among objects (step Sc).

More specifically, the controller 210 calculates, for each object, a number of overlapping detectable substances from area sizes or peripheral lengths of the extracted object. Each detectable substance has a length of approximately 25 mm, and hence has an area size of 10,000 to 33,000 (pixels) and a peripheral length of 8,50 to 1,500 (pixels). The controller 210 therefore determines "2" as a number of overlapping detectable substances if an object has an area size which is equal to or greater than 33,000 and smaller than 55,000 or if an object has a peripheral length which is equal to or greater than 1,500 and smaller than 3,000. Otherwise, the controller 210 determines "3 or more" as a number of overlapping detectable substances if an object has an area size which is equal to or greater than 55,000 or if an object has a peripheral length which is equal to or greater than 3,000. Yet otherwise, the controller 210 determines "1" as a number of overlapping detectable substances if an object has an area size smaller than 33,000 or if an object has a peripheral length smaller than 1,500. In this manner, as shown in FIG. 18, if an object is regarded as not causing overlapping, the number of overlapping detectable substances is determined to be "1" for the object. If an object is regarded as a mixture of two overlapping detectable substances, the number of overlapping detectable substances is determined to be "2". If an object is regarded as a mixture of three or more overlapping detectable substances, the number of overlapping detectable substances is determined to be "3 or more".

Figure 19:
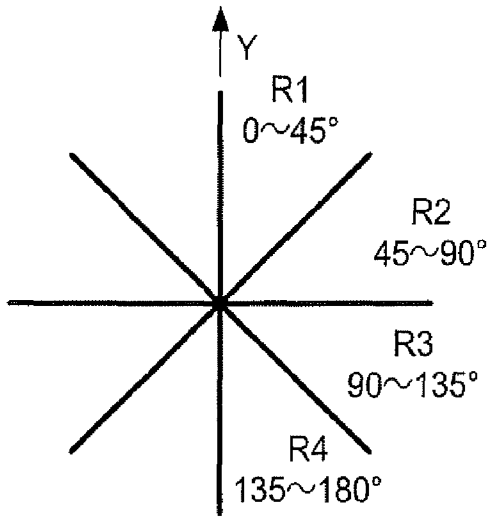
FIG. 19 illustrates angular ranges.

Subsequently, as shown in FIG. 17, the controller 210 specifies an angular range indicating a range to which an angle of each object belongs (step Sc4). FIG. 19 illustrates angular ranges. The angle of an object is defined as an angle between the lengthwise direction of the object and the Y coordinate axis. As shown in FIG. 19, an angle of an object, which is equal to or greater than 0 degree and smaller than 45 degrees, belongs to an angular range R1. An angle of an object, which is equal to or greater than 45 degrees and smaller than 90 degrees, belongs to an angular range R2. An angle of an object, which is equal to or greater than 90 degrees and smaller than 135 degrees, belongs to an angular range R3. An angle of an object, which is equal to or greater than 135 degrees and smaller than 180 degrees, belongs to an angular range R4. In case of the example shown in FIGS. 13 to 15, the objects A, B, and C are specified as belonging to the angular range R4, and the object D is specified as belonging to the angular range R2.

In FIG. 17, the controller 210 further determines whether processings of the foregoing steps Sc2 to Sc4 have been executed on all of the objects included in the image information or not (step Sc5). If the controller 210 determines that a divisional image area as belonging to, an angular range, and a number of overlapping detectable substances have been specified for each of all objects (step Sc5: YES), the controller 210 executes a processing for calculating feature amounts characterizing distribution of detectable substances.

The controller 210 calculates a total number of objects which belong to the entire image area expressed by the image information (step Sc6). In this example, the total number of objects is calculated to be "10" as a total number of the objects A to J. Subsequently, the controller 210 calculates a sub-total number of objects which belong to a divisional image area (a sub-total per divisional image area), for each of the divisional image areas F1 to F9 (step Sc7). In the example shown in FIG. 20, no object belongs to the divisional image area F1, and therefore, the sub-total number of objects per divisional image area is "0" for F1. For the divisional image area F2, the sub-total number of objects per divisional image area is "1" since one object belongs to the divisional image area F2. For the divisional image area F5, the sub-total number of objects per divisional image area is "3" since objects D, E, and F belong to the divisional image area F5. Subsequently, the controller 210 calculates sub-total numbers of objects, which are sorted by numbers of overlapping detectable substances, for the entire image area expressed by the image information (step Sc8). The controller 210 has already specified a number of overlapping detectable substances for each of the objects, in the step Sc3. The controller 210 hence sorts the objects into three subsidiary fields: a subsidiary field "1" which includes objects each consisting of one single detectable substance causing no overlapping; a subsidiary field "2" which includes objects each consisting of two overlapping detectable substances; and a subsidiary field "3 or more" which includes objects each consisting of three or more overlapping detectable substances. The controller 210 calculates a sub-total number of objects, for each of these subsidiary fields.

Figures 20, 24:
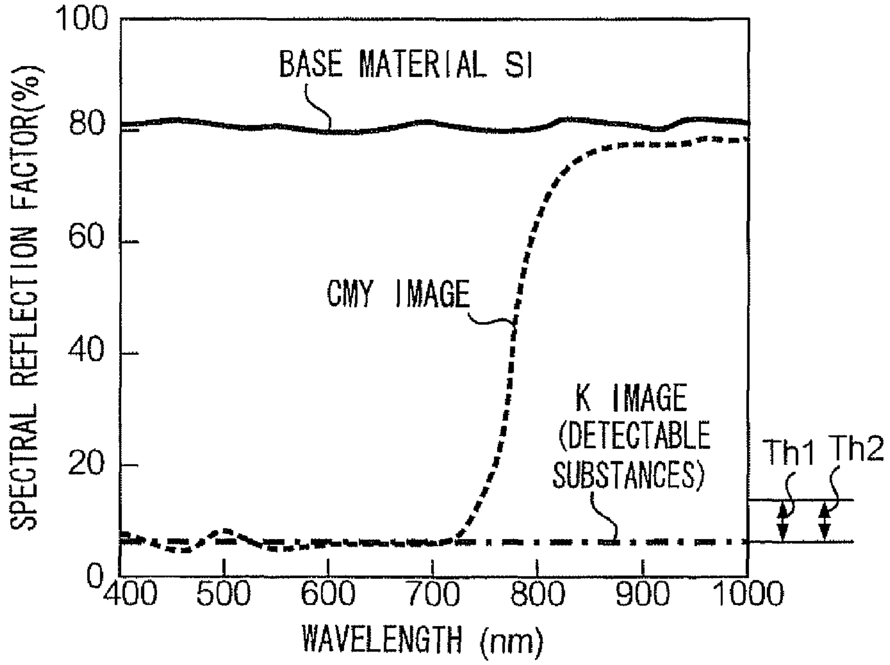
FIG. 20 is a table showing an image area, an angular range, and a number of overlapping detectable substances, which are specified for each object.
FIG. 24 is a graph schematically showing relationships between wavelengths and spectral reflection factors, with respect to a base material, a CMY image, and a K image.

Next, the controller 210 calculates a sub-total number of objects which belong to each of the angular ranges R1 to R4 (step Sc9). In the example of FIG. 20, objects E, G, and H belong to the angular range R1, and therefore, the sub-total number of belonging objects is "3" for the angular range R1. Objects D and I belong to the angular range R2, and therefore, the sub-total number of belonging objects is "2" for the angular range R2. Only an object J belongs to the angular range R3, and therefore, the sub-total number of belonging objects is "1" for the angular range R3. Objects A, B, C, and F belong to the angular range R4, and therefore, the sub-total number is "4" for the angular range R4.

Figures 21, 26:
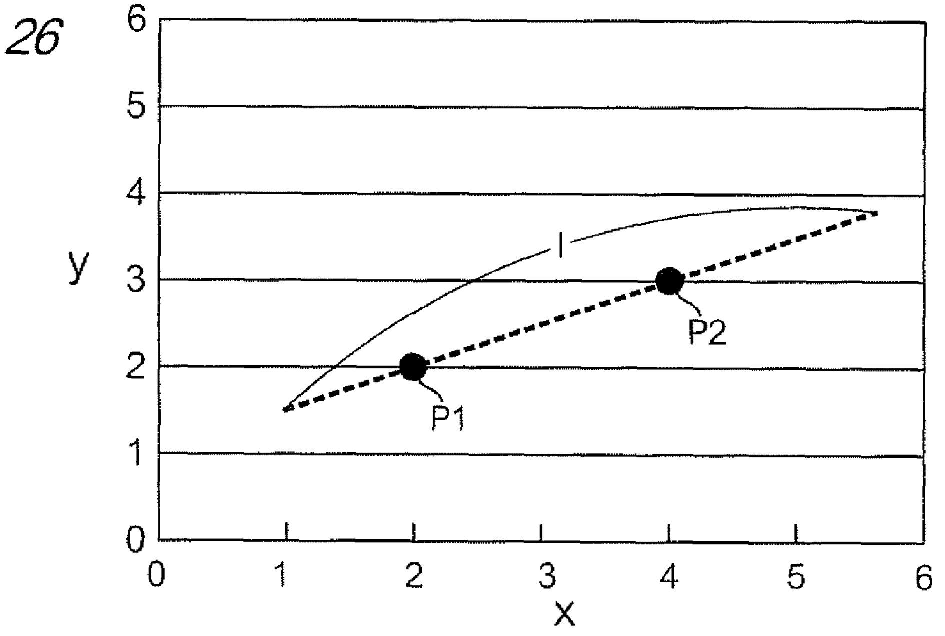
FIG. 21 is a table showing feature amounts characterizing distribution of detectable substances, which are written into the information management table by the controller of the registration device.
FIG. 26 is a graph explaining a Hough conversion transform.

After calculating feature amounts characterizing distribution of detectable substances in a manner as described above, the controller 210 writes the feature amounts into the ID information management table 241 in the ID information storage unit 240 (step Sc10). FIG. 21 shows feature amounts characterizing distribution of detectable substances which are written into the ID information management table 241 at this time. Content of the ID information management table 241 exemplified already in FIG. 4 is a collection of feature amounts characterizing distribution of detectable substances which are obtained for individual pages.

Image Forming Processing

Next, the Image forming processing of the step Sd in FIG. 10 will be described in detail. This processing is to form a visible image on a paper sheet in accordance with image information generated by the Image forming processing described above.

Figure 22:
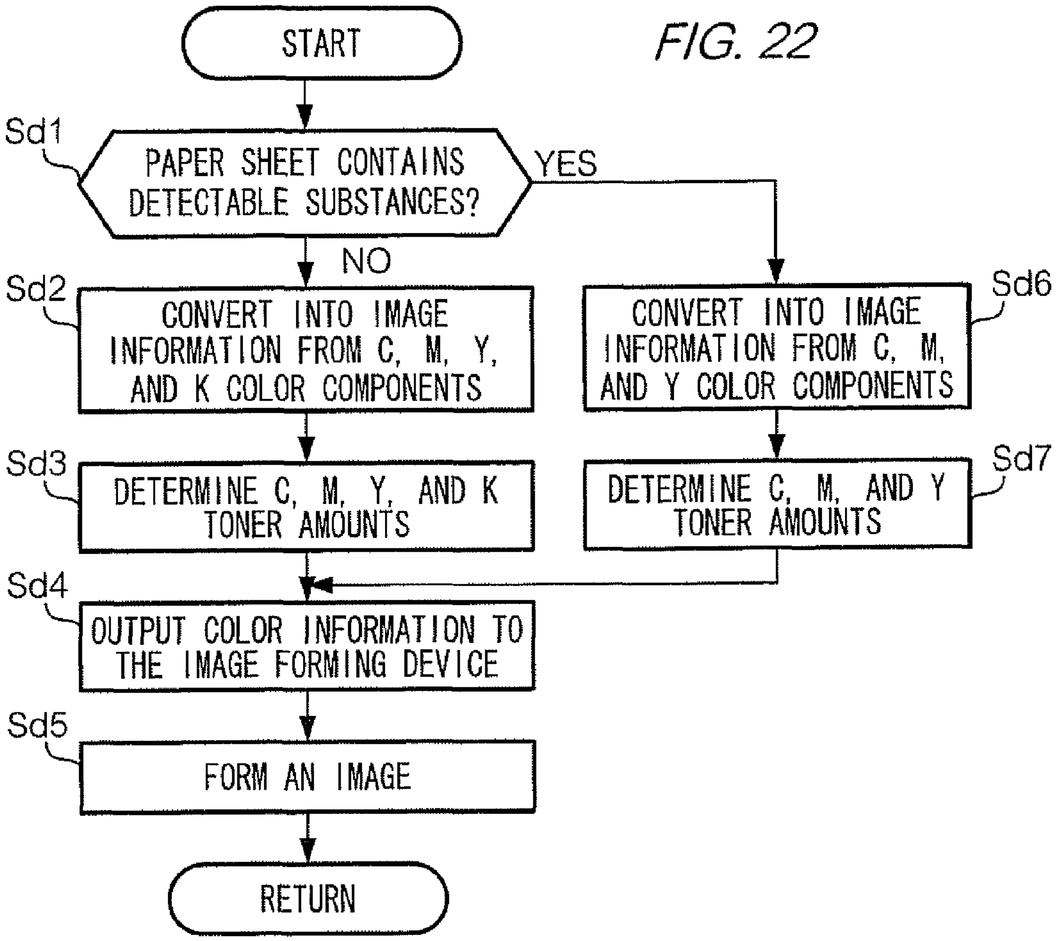
FIG. 22 is a flowchart showing an image forming processing executed by the controller of the registration device.

FIG. 22 is a flowchart showing the Image forming processing in the step Sd. The following description will be made along with the flowchart. At first, the controller 210 determines whether detectable substances are contained in a paper sheet or not (step Sd1). At this time, the controller 210 determines that a paper sheet contains detectable substances if, for example in the step Sc10, feature amounts for at least one object are determined as having been written in content of the ID information management table 241 (shown in FIG. 21). Otherwise, the controller 210 may make such a determination on the basis of detection values concerning objects which are stored in the memory 212.

The controller 210 determines types of toners to be used for forming a visible image, depending on whether detectable substances have been detected from the paper sheet.

At first, if the controller 210 determines that no detectable substance is contained in the paper sheet (step Sd1: NO), types of toners used for forming a visible image are set to four color toners of cyan, magenta, yellow, and black (hereinafter referred to as "CMYK toners"). Further, the controller 210 converts image information, which has been obtained through the communication unit 260 or the like to form a visible image with use of the determined types of toners, into image information constituted of four color components of C, M, Y, and K (step Sd2). Specifically, the controller 210 firstly converts the image information into image information constituted of three color components of C, M, and Y, and then executes a UCR (Under Color Removal) processing. By the UCR processing, an area where three color components of C, M, and Y overlap each other thereby presenting gray and/or black colors is applied with a K color component according to density of the gray and/or black colors. That is, image information constituted of three color components of C, M, and Y is converted into image information constituted of four color components of C, M, Y, and K by the UCR processing. Subsequently, the controller 210 executes a half-tone processing on each pixel included in the converted image information, to determine toner amounts of CMYK toners in accordance with the image information (step Sd3). Further; the controller 210 outputs, to the image forming unit 250, color information for controlling image forming engines in accordance with the toner amounts (step Sd4). Further, the image forming unit 250 forms a visible image on a paper sheet by using the CMYK toners (step Sd5). In this case, the image forming unit 250 forms a black image by using a K toner (a second coloring material).

Otherwise, if detectable substances are contained in the paper sheet, the determination result of the step Sd1 is "YES". In this case, the controller 210 sets, as the types of toners to be used for forming a visible image, three color toners of cyan, magenta, and yellow (hereinafter "CMY toners" (a first color material)). The controller 210 converts image information, which has been obtained from the communication unit 260 or the like to form a visible image with use of the determined types of toners, into image information constituted of three color components of C, M, and Y (step Sd6). At this time, image areas to be colored in black and gray are expressed by overlapping C, M, and Y toners on each other. Further, the controller 210 executes a half-tone processing on each pixel included in the converted image information, to determine toner amounts of CMY toners in accordance with the converted image information (step Sd7). Further, the controller 210 outputs, to the image forming unit 250, the color information for controlling image forming engines for these colors in accordance with the toner amounts, and causes the image forming unit 250 to form a visible image by using the CMY toners (steps Sd4 and 5). In this case, the image forming unit 250 forms a black image by using the CMY toners.

As described above, if a paper sheet is watermarked with detectable substances, the registration device 200 does not use the K toner to form a visible image. This is because with this configuration, detectable substances can be more easily extracted from an image which is read from a printed material by the comparison device 300.

While forming a visible image, the controller 210 writes an "image forming date/time", a "device ID", a "file ID", a "page number", a "user ID", and "take-out availability". The controller 210 writes a present date/time as the "image forming date/time", and a device ID assigned to the registration device 200 as the "device ID". The "file ID", "page number", and "user ID" are information which can be specified by referring to image information expressing a visible image formed on a paper sheet or by referring to a header of the image information. The controller 210 therefore writes such specified information as the "file ID", "page number", and "user ID". The "take-out availability" is information which is described in a header of image information or is specified by a user when giving an instruction to execute an Image forming processing. The controller 210 therefore refers to such information and writes the information into the property information management table 242.

2-2 Operation of Comparison Device 300

Next, operation of the comparison device 300 will now be described below.

A user who wants to take out a printed material sets the printed material on a platen glass of the image read unit 320, and makes a manipulation for carrying out a comparison (e.g., presses down a button). The controller 310 of the comparison device 300 executes the feature amount calculation/comparison program P4. The following description of the operation of the comparison device 300 will be made with regard to a case where feature amounts calculated from the image shown in FIG. 13 (see FIG. 21) are compared with content (feature amounts) of the ID information management table 241 shown in FIG. 4.

At first, the controller 310 controls the image read unit 320 to read the printed material, and obtains image information generated by the image read unit 320 through the interface 313. At this time, the image read unit 320 generates the image information on the basis of intensity of reflection light from the printed material.

Figure 23B:
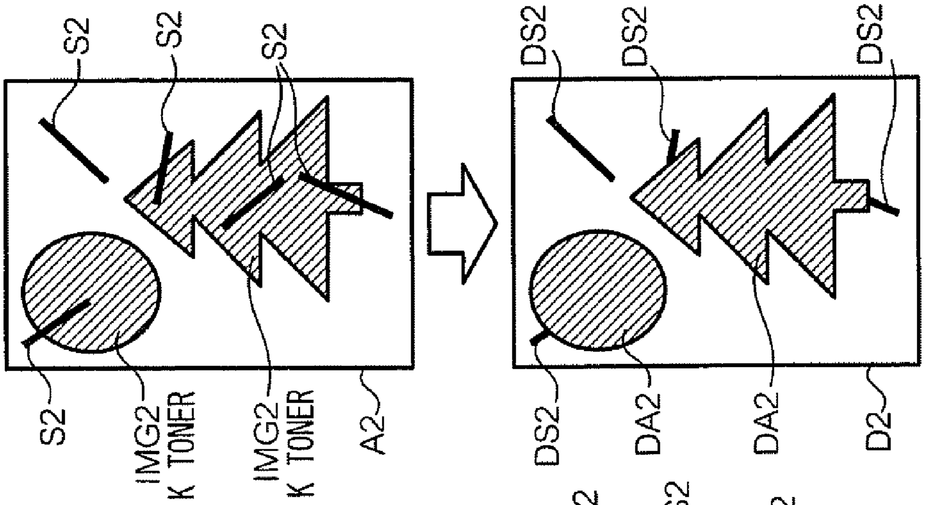
FIGS. 23A and 23B show examples of printed materials and images read from the printed materials.
Figure 23A:
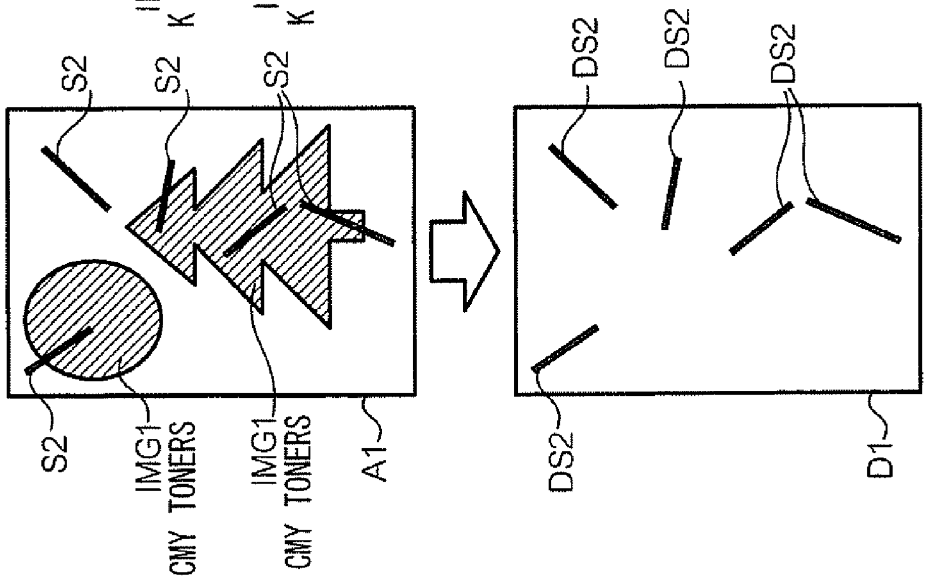

FIGS. 23A and 23B each are plan views showing a visible image formed on a printed material, and an example of an image expressed by image information which is read and generated from the printed material by the image read unit 320. A printed material A1 shown in an upper part of FIG. 23A, visible image objects IMG1 are formed only of CMY toners. A printed material A2 shown in an upper part of FIG. 23B, visible image objects IMG2 are formed only of a K toner. Broken lines S2 scattered in the printed materials A1 and A2 indicate respectively detectable substances S2 watermarked in the paper sheet. The visible image objects IMG1 and IMG2 are each formed and positioned overlapping the detectable substances S2.

As shown in the upper part of FIG. 23A, the visible image objects IMG1 are formed on the printed material A1 by using CMY toners. However, as shown in the lower part of FIG. 23A, no image parts corresponding to the visible image objects IMG1 appear in an image D1 read by the image read unit 320, and only image parts DS2 corresponding to the detectable substances S2 appear in the image D1. On the other side, visible image parts IMG2 are formed in the printed material A2, as shown in the upper part of FIG. 23B. However, as shown in the lower part of FIG. 23B, image parts DA2 corresponding to the visible images IMG2 appear mixed with image parts DS2 corresponding to the detectable substances S2, in an image D2 read by the image read unit 320. Thus, the visible image part and detectable substance images which are formed of the K toner clearly appear in the image information generated by the image read unit 320 although the visible image formed only of the CMY toners does not substantially appear in the image information at all. This results from a situation which will be described in detail below.

FIG. 24 is a graph schematically showing relationships between wavelengths of emitted light and spectral reflection factors, for each of a base material S1, a visible image formed by using all of the CMY toners (hereinafter a "CMY image"), and a visible image formed by using the K toner (hereinafter a "K image"). Spectral reflection factors can be measured by using, for example, U-2900 manufactured by Hitachi High-Technologies Corporation. The "spectral reflection factor" is obtained by dividing intensity of emitted light by intensity of reflection light. The base material S1 is white and therefore has a sufficient high spectral reflection factor. Accordingly, as shown in FIG. 24, the base material S1 maintains a relatively high spectral reflection factor of 80% within a visible light range of 400 nm to 700 nm. On the other side, both of the CMY image and K image have relatively high light absorption rates, and accordingly have relatively low spectral reflection factors of approximately 5%.

A wavelength range of approximately 700 nm to 1,000 nm is a high-wavelength range close to a visible light range within an infrared range. In the high-wavelength range, the base material S1 has a spectral reflection factor of approximately 80%, and the K toner has a spectral reflection factor of approximately 5%. These spectral reflection factors are almost the same as those in the visible light range. However, the spectral reflection factor of the CMY image abruptly rises to approximately 720 nm, and is substantially constant at slightly less than 80%, in a higher wavelength range than 820 nm. On the other side, the spectral reflection factor of the K image stays low even in the wavelength range of 700 to 1,000 nm. This is because the K toner contains carbon black as a pigment, which has a property of maintaining a substantially constant low spectral reflection factor, from an ultraviolet light range to the infrared range. Detectable substances have a low spectral reflection factor which is substantially as low as that of the K image, regardless of wavelength ranges. This is because the detectable substances used in this exemplary embodiment have a low spectral reflection factor near the range of 700 nm to 1,000 nm.

As can be seen from the above, a difference of approximately 70% exists between the spectral reflection factor of the CMY image and those of the K image and detectable substances, in the wavelength range of 700 nm to 1,000 nm.

The image read unit 320 generates image information, based on light in the wavelength range of 700 nm to 1,000 nm as described above. Therefore, of an image read from a printed material, image parts corresponding to a CMY image and a base material have a high brightness, and image parts corresponding to detectable substances and a K image have a low brightness. Therefore, in the images D1 and D2 shown in FIG. 23, image parts corresponding to a CMY image and base materials do not appear while detectable substance images DS2 and image parts DA2 corresponding to a K image appear clearly.

Based on the above situation, if the registration device 200 forms only a CMY image without forming a K image in case of a paper sheet watermarked with detectable substances, only detectable substance images are expressed by a high grey-scale value (corresponding to low brightness) in an image read by the image read unit 320 (as shown in the image D1 in FIG. 23). Through the object extraction processing as described previously, the controller 310 extracts detectable substance images on the basis of differences between grey-scale values of pixels of detectable substance images and grey-scale values of the other pixels (steps Sb9 and Sb10). Therefore, detectable substance images are easily extracted if the registration device 200 does not form a K image.

The image read unit 320 generates image information by reading a printed material in a manner as described above. The controller 310 then executes the object extraction processing and the feature amount calculation processing on the image information obtained from the image read unit 320. Processes of the object extraction processing and the feature amount calculation processing (steps Sb and Sc in FIG. 10) are the same as those of processings executed by the controller 310 of the registration device 200 which have been described above. Therefore, descriptions of such processes will be omitted herefrom.

At this time, if visible images are formed only of CMK toners on a printed material, noise images may be included in addition to detectable substance images. This is because areas of lower spectral reflection factors are formed depending on positions and amounts of applied CMK toners. Such areas appear as noise images in a read result of the image read unit 320. Even in this case, noise images are removed by the object extraction processing, so that detectable substance images can be easily extracted. After calculating feature amounts based on the printed material, the controller 310 executes a comparison processing for comparing the calculated feature amounts with feature amounts written in the ID information management table 241.

Figure 25:
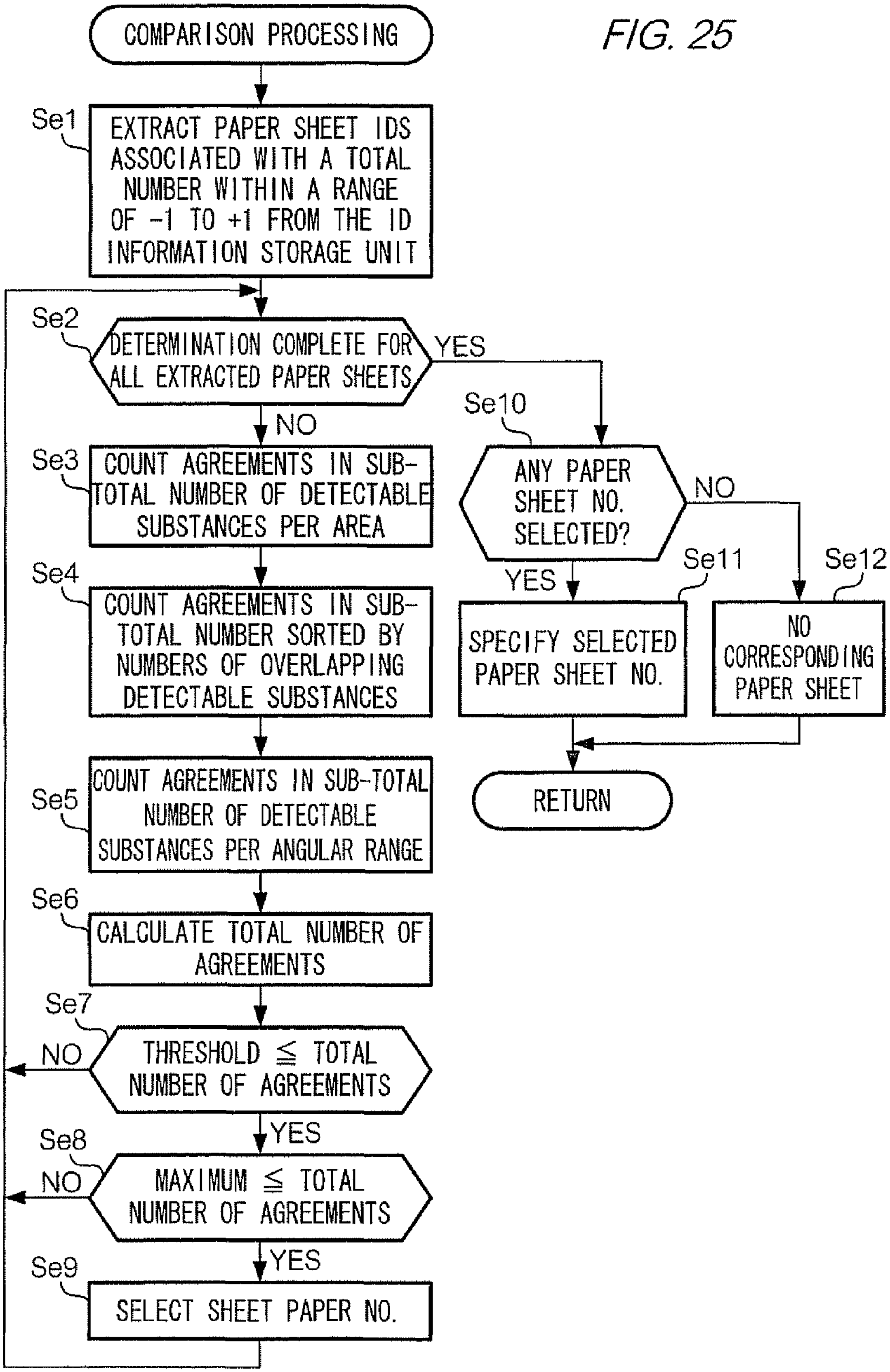
FIG. 25 is a flowchart showing a comparison processing executed by the controller of the comparison device.

FIG. 25 is a flowchart showing a comparison processing executed by the controller 310.

In the figure, the controller 310 firstly extracts, from the ID information management table 241, paper sheet IDs each associated with a total number of objects which is equal to or different by “1” from a total number of objects as a calculated feature amount (step Se1). Since the total number of objects which belong to the image shown in FIG. 13 is “10”, the controller 310 extracts only paper sheet IDs “2”, “6”, “7”, “8”, and “9” for which the “9”, “10”, or “11” is written in the field “total number”. If a large number of information items are stored in the ID information management table 241, an enormously long time is required to complete this processing until the controller 310 compares all stored feature amounts. Therefore, the controller 310 firstly narrows paper sheet IDs each associated with a total number of objects which is almost equal to the total number of objects as a calculated feature amount, in order to reduce load of the comparison processing.

The controller 310 determines whether feature amounts have been compared for all paper sheet IDs or not (step Se2). Since feature amounts have not yet been compared for any paper sheet ID (step Se2: NO), the controller 310 goes to the step Se3. In the step Se3, the controller 310 focuses on one of the extracted paper sheet IDs, and calculates a number of divisional image areas among divisional image areas F1 to F9, for each of which a sub-total number of objects per divisional image area, as a calculated feature amount, is equal to one of corresponding values written in the field of “number of detectable substances per area” associated with the focused paper sheet ID (step Se3). Subsequently, the controller 310 calculates a number of groups among groups “1”, “2”, and “3 or more”, for each of which a calculated feature amount is equal to one of corresponding values written in the field “sub-total number sorted by numbers of overlapping detectable substances” associated with the focused paper sheet ID (step Se4). Further, the controller 310 calculates a number of angular ranges among the angular ranges R1 to R4, for each of which a number of included objects is equal to one of corresponding values written in the field “number of detectable substances per angular range” associated with the focused paper sheet ID (step Se5). Further, the controller 310 calculates a total sum (hereinafter referred to as a “total number of agreements”) of all numbers of areas, groups, and ranges calculated in the foregoing steps Se3 to Se5 (step Se6). In this exemplary embodiment, the “total number of agreements” is “3” for the paper sheet ID “2” and is “16” for the paper sheet ID “9”.

The controller 310 determines whether the total number of agreements is equal to or greater than a predetermined threshold (step Se7). The predetermined threshold may be 80 percent. Namely, it may be determined that a printed material agrees with a paper sheet assigned with a subject paper sheet ID, if a feature amount of the former does not completely agree with a feature amount of the latter. If the controller 310 determines the total number of agreements to be less than the threshold (step Se7: NO), the controller 310 determines that a printed material disagrees with a paper sheet assigned with the paper sheet ID focused at present, and returns to the step Se2.

Otherwise, if the controller 310 determines the total number of agreements to be equal to or greater than the threshold (step Se7: YES), the controller 310 further determines whether the total number of agreements is maximum at present or not (step Se8). In other words, if the controller 310 has already specified another paper sheet ID which has resulted in a greater total number of agreements as a maximum value than the total number of agreements resulting from a paper sheet ID focused at present (step Se8: NO), the controller 310 determines that a printed material disagrees with a paper sheet assigned with the paper sheet ID focused at present. The controller 310 then returns to the step Se2 described previously, and repeats the processings also described previously, focusing on another one of the extracted paper sheet IDs. Otherwise, if the controller 310 determines the total number of agreements for the paper sheet ID focused at present is greater than the maximum value (step Se8: YES), the controller 310 selects the paper sheet ID focused at present (step Se9). The controller 310 then returns to the step Se2, and repeats the processings as described previously, focusing on another one of the extracted paper sheet IDs.

If the controller 310 determines that comparisons are complete for all of the extracted paper sheet IDs (step Se2: YES), the controller 310 determines whether a paper sheet ID has been selected in the step Se9 (step Se10). As described above, the controller 310 selects the paper sheet ID "9" in the step Se9 (step Se10: YES), and therefore specifies the paper sheet ID "9". The controller 310 accordingly specifies the printed material as agreeing with the paper sheet assigned with the paper sheet ID "9" (step Se11). Further, the controller 310 determines whether take-out of the printed material as a target of the comparison processing is allowed or inhibited, based on the property information management table 242 (see FIG. 5) stored in the ID information storage unit 240. Referring to FIG. 5, "inhibited" is written in the field "take-out availability" associated with the paper sheet ID "9". Accordingly, in order to inhibit take-out of the paper sheet assigned with the paper sheet ID, the controller 310 outputs a control signal to the door open/close unit 401 so as to keep the door 400 closed. At this time, the controller 310 may cause the notification unit 340 to show various property information associated with the paper sheet ID "9", or may cause a storage unit not shown to write such various associated property information into a predetermined file.

Meanwhile, if the controller 310 determines in the step Se10 that no paper sheet ID has been selected in the step Se9 (step Se10: NO), the controller 310 determines that the printed material as a target of the comparison processing is not registered in the registration device 200 and that there is no associated paper sheet (step Se12). Therefore, the controller 310 determines to allow take-out of the paper sheet outside, and outputs a control signal to open the door 400. At this time, the controller 310 outputs a control signal to cause the notification unit 340 to generate an audio signal or show a message, so that the user is invited to make registration in the registration device 200.

B Second Exemplary Embodiment

Next, a second exemplary embodiment of the invention will be described. In the second exemplary embodiment, the feature amount calculation processing and the comparison processing operate differently from those in the first exemplary embodiment. Operations other than the foregoing processings and device structures are the same as those in the first exemplary embodiment. In the following description, only the feature amount calculation processing and the comparison processing will therefore be described in detail.

In this exemplary embodiment, the feature amount calculation processing in the step Sc shown in FIG. 10 is carried out by a Hough transform processing.

At first, the Hough transform processing will now be described. Where pixel positions are expressed by X and Y coordinates in image information in which grey-scale values are expressed by binary values, every line that penetrates a pixel positioned at coordinates (x, y) can be expressed by the following expression 1 on X-Y coordinates, wherein p is a distance from the origin to a line which penetrates the coordinates (x, y) and extends an angle θ to the X axis.

$$\rho = x\cos\theta + y\sin\theta \quad (0 \leqq \theta < \pi) \tag{1}$$

Figure 27:
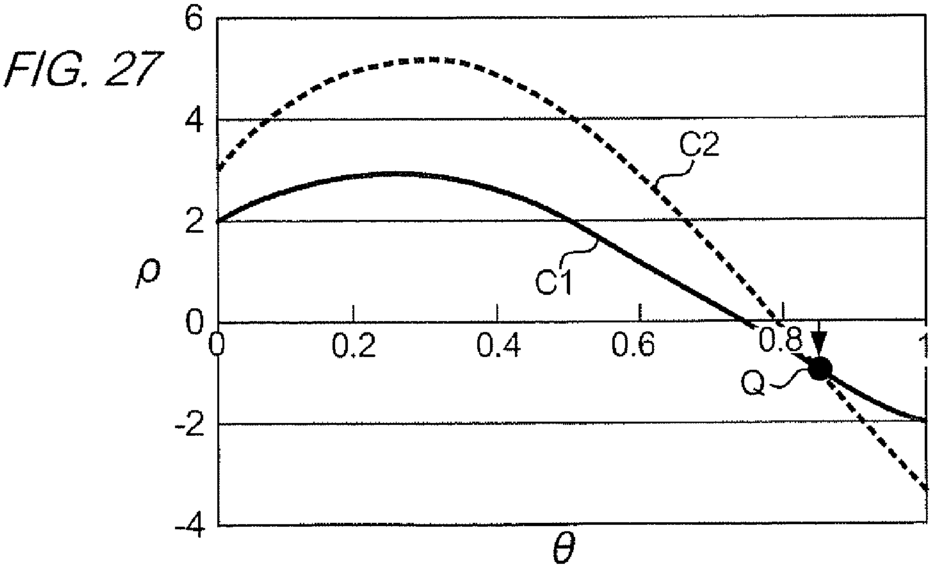
FIG. 27 is another graph explaining a Hough conversion transform.

For example, θ in the expression 1 is sequentially changed from 0 to π for each of the pixels positioned at coordinates P1 (x1, y1) and P2 (x2, x2) on a line 1 shown in FIG. 26, and ρ obtained in accordance with the change of θ is plotted on ρ-θ coordinates as shown in FIG. 27. Then, every line that penetrates a pixel can be expressed as a curve on ρ-θ coordinates (i.e., polar coordinates). This curve is called a Hough curve. A Hough curve relative to the coordinates P1 is referred to as a Hough curve C1, and a Hough curve relative to the coordinates P2 is referred to as a Hough curve C2. In this manner, a processing for obtaining a Hough curve is called a Hough transform.

As shown in FIG. 27, the Hough curves C1 and C2 each are uniquely specified by the position of the line 1 and the inclination of the line 1. There is an intersection Q ($\rho_0$, $\theta_0$) between the Hough curves C1 and C2. By referring to values of $\rho_0$ and $\theta_0$ at the intersection Q, the line 1 can be uniquely specified. That is, every Hough curve penetrates the intersection Q ($\rho_0$, $\theta_0$) insofar as the Hough curve is expressed based on a pixel positioned on any coordinates of a point on the line 1.

Next, the feature amount calculation processing executed by using the Hough transform described above will be described below.

At first, the controller 210 of the registration device 200 generates image information read from a paper sheet, and then executes a binarization processing with use of a predetermined threshold. Next, the controller 210 executes the Hough transform on the image information, to obtain Hough curves. As has been described previously, detectable substances are substantially linear, and therefore, detectable substance images are substantially linear. That is, plural Hough curves expressed based on a detectable substance image intersect each other at a certain pair of coordinates in a Hough plane. Accordingly, the controller 210 can obtain information corresponding to the position and inclination of the detectable substance by referring to coordinates indicating an intersection between a large number of Hough curves to each other (i.e., a pair of coordinates at which a large number of intersections (i.e., votes) between Hough curves to each other exist). Even if image parts which are not detectable substance images are included in an image, the image parts are not extracted erroneously by mistaking them to be detectable substance images. This is because an image part which is not a detectable substance image does not gather a large number of votes in the Hough plane unless the image part has a linear shape having a certain length. In addition, each paper sheet is watermarked with approximately several to fifty detectable substances. The controller 210 can therefore specify positions of detectable substance images by extracting coordinates in an order from a detectable substance image gathering the greatest number of votes.

In this manner, the controller 210 extracts coordinates (ρ, θ) corresponding in number to detectable substances, in an order from coordinates containing the greatest number of votes in the Hough plane. The controller 210 writes the extracted coordinates as feature amounts characterizing distribution of detectable substances into the ID information storage unit 240. If a detectable substance is more or less curved, such a detectable substance results in that intersections between plural Hough curves do not perfectly agree with each other in a Hough plane. Even in this case, a large number of intersections are concentrated in a small range. Accordingly, such a slightly curved detectable substance can be extracted as a detectable substance image by focusing on the number of votes concentrated in a predetermined range.

Described next will be a comparison processing executed by the comparison device 300.

In this comparison processing, the controller 310 of the comparison device 300 firstly generates image information read from a printed material, and then executes a binarization processing and a Hough transform processing, as in the comparison processing of the registration device 200. Further, the controller 310 extracts coordinates in an order from coordinates containing the greatest number of votes in the Hough plane, and stores the extracted coordinates as feature amounts characterizing distribution of detectable substances into the ID information storage unit 240.

Further, the controller 310 selects one after another points expressed as coordinates from feature amounts stored in the ID information storage unit 240, and calculates a Euclidian distance in the Hough plane, in order to compare the feature amounts stored in the ID information storage unit 240 and the feature amounts calculated from a printed material. If the Euclidian distance is "0" or a predetermined value or less, the controller 310 determines the position and inclination of a detectable substance in a printed material as agreeing with those of a detectable substance according to the stored feature amounts. Further, if there is a paper sheet ID associated with feature amounts which result in a predetermined number of agreements or more in position and inclination with detectable substances read from a printed material, the controller 310 determines the printed material as agreeing with a paper sheet assigned with the paper sheet ID. Subsequent processings are the same as those in the first exemplary embodiment described previously.

C Third Exemplary Embodiment

Next, a third exemplary embodiment of the invention will be described. The third exemplary embodiment operates differently from the first exemplary embodiment though the first and third exemplary embodiments have the same device structures as each other. The following description will therefore be focused on content of the operations. In the third exemplary embodiment, the comparison device 300 executes a comparison processing by using a cross spectrum. That is, a comparison is made depending on how much image information generated from a registered paper sheet and image information generated from a printed material are similar to each other, based on interrelationships between the image information generated from a registered paper sheet and that from a printed material.

At first, the controller 210 of the registration device 200 generates image information by reading a paper sheet, and then executes a binarization processing with use of a predetermined threshold. By this processing, each of the white pixels is expressed by a grey-scale value "0", and each of the black pixels is expressed by a grey-scale value "1". Next, the controller 210 divides an image expressed by the image information into plural divisional image areas, and generates superimposed image information by layering the divisional image areas onto each other. Superimposed image information is used on the ground that a comparison processing using a cross spectrum requires a large calculation amount, so that a long time is required for the processing. By using superimposed image information in which divisional image areas divided from an image area are layered onto each other, a calculation amount and a processing time required for the comparison processing are much reduced. Besides, feature amounts of detectable substances can be maintained in the superimposed image information.

Figure 28:
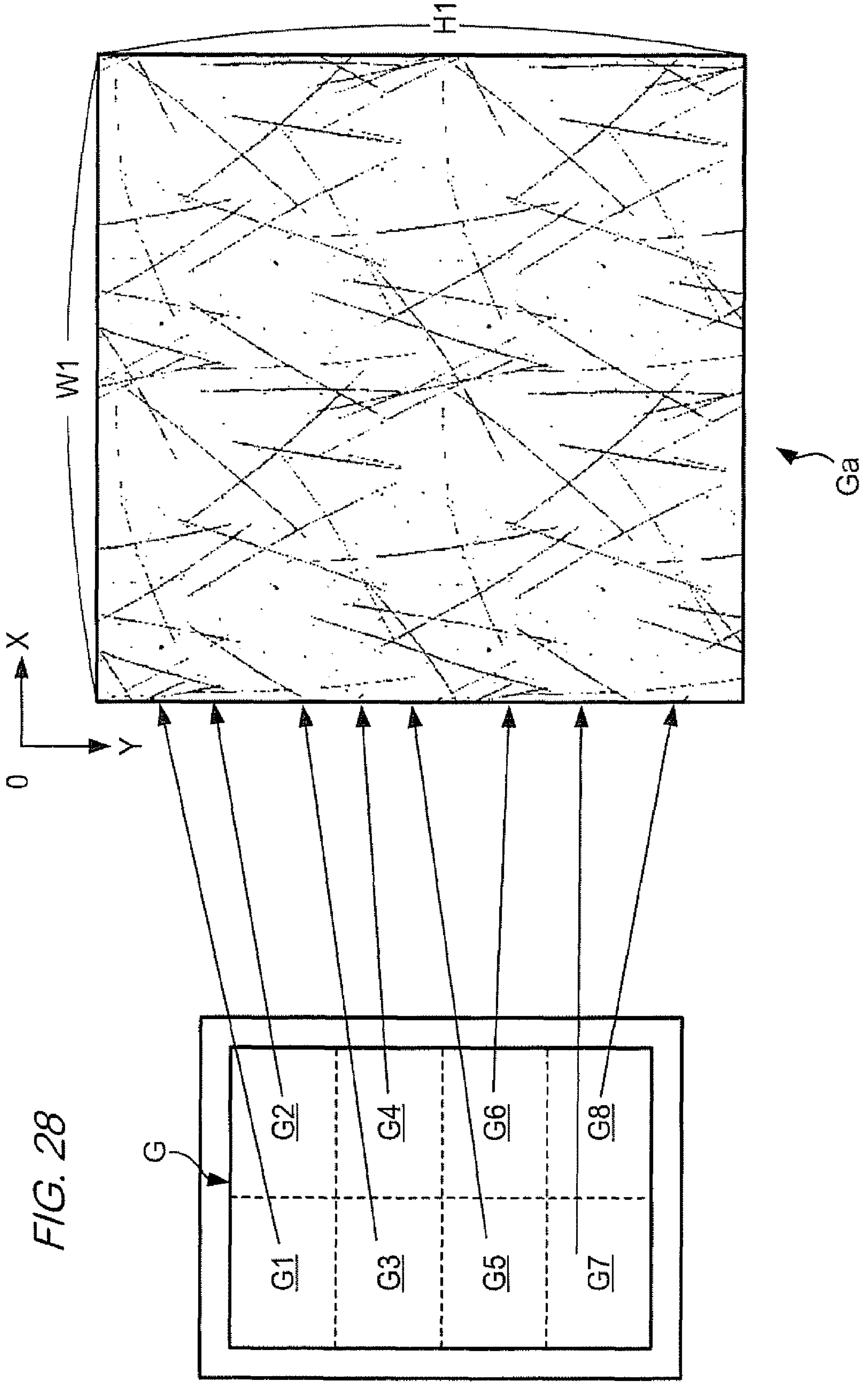
FIG. 28 schematically shows a method of generating superimposed image information.

FIG. 28 is a view to explain a method for generating superimposed image information. The controller 210 divides an image G expressing certain image information into divisional image areas arrayed on a matrix, e.g., total number of eight divisional image areas each having a length W1 in the X direction and a length H1 in the Y direction. In this example, each divisional image area is further divided into pixels arrayed in a matrix of 256 pixels in the X direction by 256 pixels in the Y direction. A remaining image area of the image G is not subjected to the comparison processing. Further, the controller 210 generates superimposed image information in which all the divisional image areas are layered. In FIG. 28, the eight divisional image areas G1 to G8 are layered onto each other as indicated by arrows in the figure, so that superimposed image information expressing a superimposed image Ga is generated. Specifically, the controller 210 calculates a logical sum of grey-scale values of layered pixels in the divisional image areas at each pixel position common to all of the layered divisional image areas. The controller 210 regards the logical sums as grey-scale values of a superimposed image. For example, if each of the black pixels expressed by a grey-scale value "1" is superimposed onto one another, a black pixel having a grey-scale value "1" is obtained. If each of the white pixels expressed by a grey-scale value "0" is superimposed onto one another, a white pixel having a grey-scale value "0" is obtained. If a black pixel having a grey-scale value "1" and a white pixel expressed by "0" are superimposed, a black pixel having a grey-scale value "1" is obtained. That is, a grey-scale value p (a, b) of a pixel positioned at coordinates (a, b) in the superimposed image information can be expressed by the following expression 2, on X-Y coordinates in which the left upper corner of an image area is an origin O. In this expression, the grey-scale value of a pixel corresponding to the coordinates (a, b) is "$P_{x,y}(a, b)$", and $0 \leqq a < W1$ and $0 \leqq b < H1$ are given on the X-Y coordinates in which the left upper end of an image area is an origin O.

$$p(a, b) = \sum_{y} \sum_{x} p_{x,y}(a, b) \qquad (2)$$

The controller 210 stores superimposed image information having pixels the grey-scale values of which are expressed by the expression 2, as feature amounts characterizing distribution of detectable substances, into the ID information storage unit 240, with the superimposed image information associated with a paper sheet ID. Hereinafter, the superimposed image information stored in the ID information storage unit 240 will be referred to as "registered superimposed image information".

Described next will be a comparison processing performed by the comparison device 300.

In the comparison processing, the controller 310 of the comparison device 300 generates superimposed image information (hereinafter referred to as "comparative superimposed image information") based on a printed material, as in the same manner as in the generation processing for generating superimposed image information, which is executed by the controller 210 of the registration device 200 as described above. Further, the controller 310 compares the comparative superimposed image information with registered superimposed image information stored in the ID information storage unit 240.

Figures 29, 32:
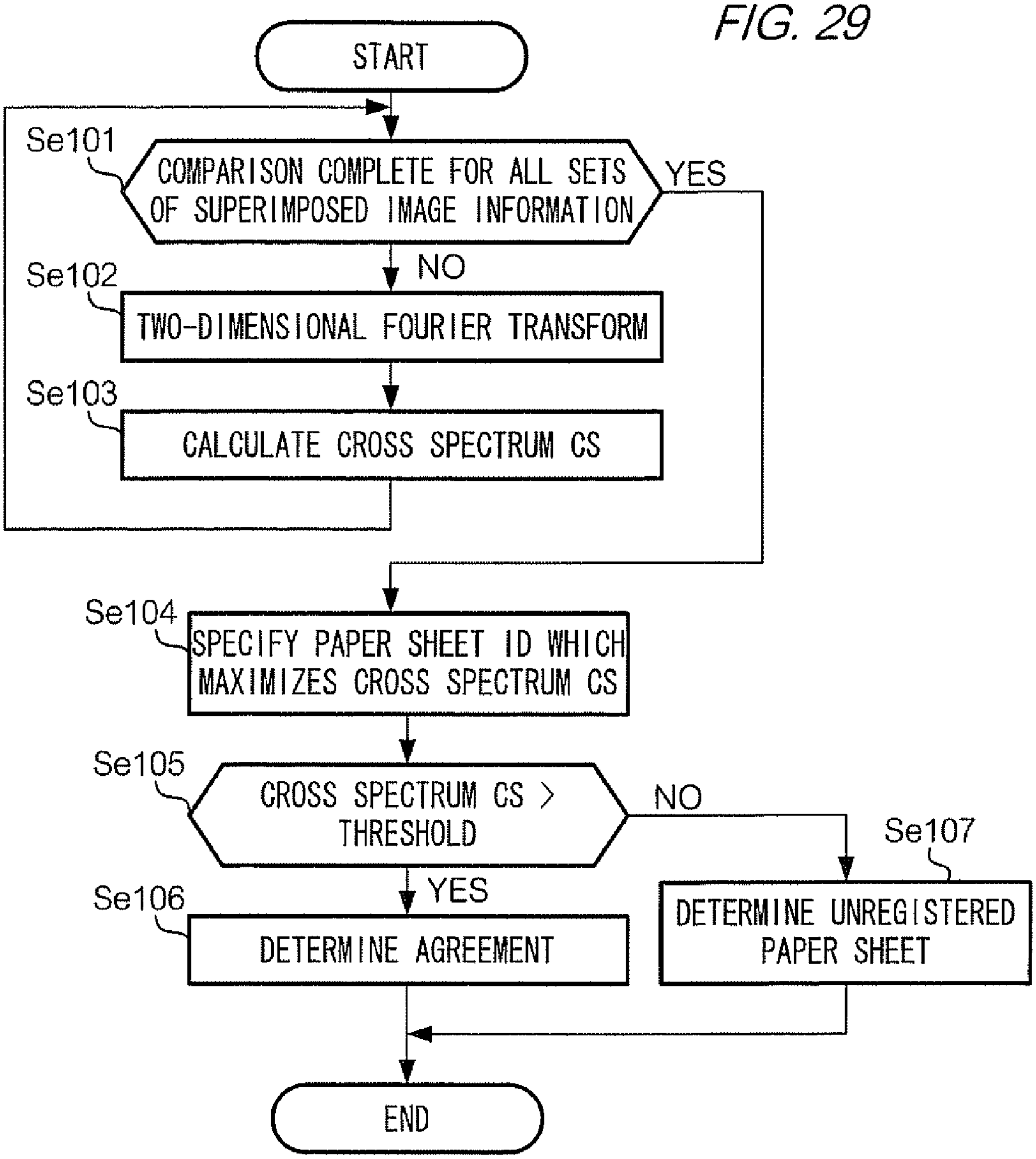
FIG. 29 is a flowchart showing a comparison processing executed by the controller of the comparison device.
FIG. 32 is a table showing relationships between image areas and angular ranges, which are read from a front surface of a paper sheet by the comparison device, and those read from a back surface of the paper sheet.

FIG. 29 is a flowchart showing a comparison processing executed by the controller 310. Content of the comparison processing will now be described below along with the flowchart.

At first, the controller 310 executes a two-dimensional Fourier transform on any set of registered superimposed image information stored in the ID information storage unit 240 and on the comparative superimposed image information (step Se102). Further, the controller 310 calculates a cross spectrum CS, based on the registered superimposed image information $F_{ir}$ and the comparative superimposed image information $F_i$ both of which have been subjected to the two-dimensional Fourier transform (step Se103). The cross spectrum is defined by the following expression 3 wherein $F^{-1}$ represents an inverse Fourier transform.

$$CS=F^{-1}(F_{ir}\times F_i) \quad (3)$$

Next, the controller 310 determines whether the comparative superimposed image information has been compared with all sets of registered superimposed image information stored in the ID information storage unit 240 or not (step Se101). If the controller 310 determines that the comparative superimposed image information has not yet been compared with all sets of registered superimposed image information (step Se101: NO), the controller 310 repeats the processing steps Se102 and Se103 described above.

Otherwise, if the comparative superimposed image information has been compared with all sets of registered superimposed image information (step Se101: YES), the controller 310 specifies a paper sheet ID which maximizes the value of cross spectrum CS (step Se104). Subsequently, the controller 310 determines whether the cross spectrum CS calculated based on the specified paper sheet ID exceeds a predetermined threshold or not (step Se105: YES). If the cross spectrum SC is determined to exceed the threshold (step Se105: YES), correlation is considered to be high between the registered superimposed image information and the comparative superimposed image information. The controller 310 accordingly determines that a paper sheet associated with the specified paper sheet ID agrees with the paper sheet of the printed material (step Se106). The aforementioned threshold is provided in view of a case that no paper sheet is registered in the registration device 200. In this case, the cross spectrum CS takes a relatively small value even when the cross spectrum CS is maximized. By providing the threshold, erroneous determinations are prevented from being made on printed materials.

Otherwise, if "NO" is a determination result of the step Se105, the controller 310 determines that the paper sheet of the printed material is not registered in the registration device 200 (step Se107), and notifies the user of this determination.

D EXAMPLE

The inventors conducted experiments using paper sheets as described in the first to third exemplary embodiments. In the experiments, printed materials were prepared by forming images only of CMY toners or a K toner on the printed materials. The printed materials were read by the comparison device 300 to check detection accuracy of detected detectable substances.

Toners used for forming visible images were those made of polyester resins, pigments, etc. For the CMY toners, pigments for respective colors of C, M, and Y were used as coloring materials, and toners having a weight-average grain size of 7 μm were used for all of these colors. For the K toner, carbon black was used as a pigment, and a toner having a weight-average grain size of 9 μm was used.

Figure 30C:
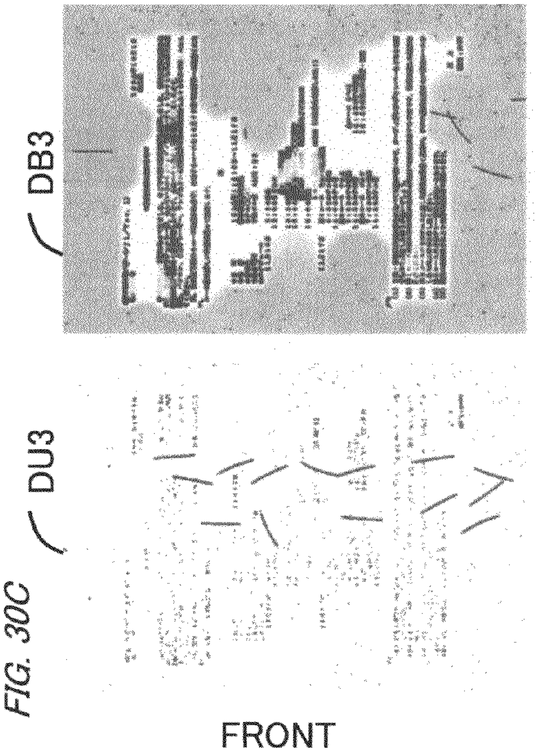
FIGS. 30A, 30B, 30C, and 30D show, as experimental results, images expressing results of reading printed materials on which visible images are formed of cyan, magenta, and yellow coloring materials, and printed materials on which visible images are formed of black coloring materials.
Figure 30D:
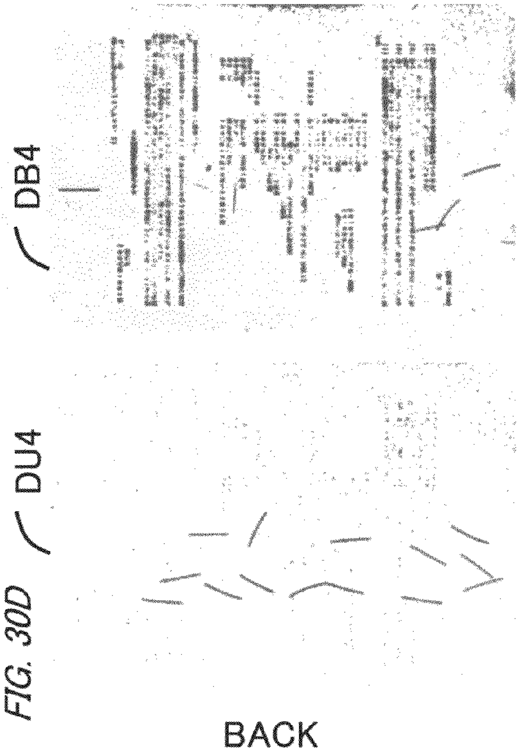
Figure 30A:
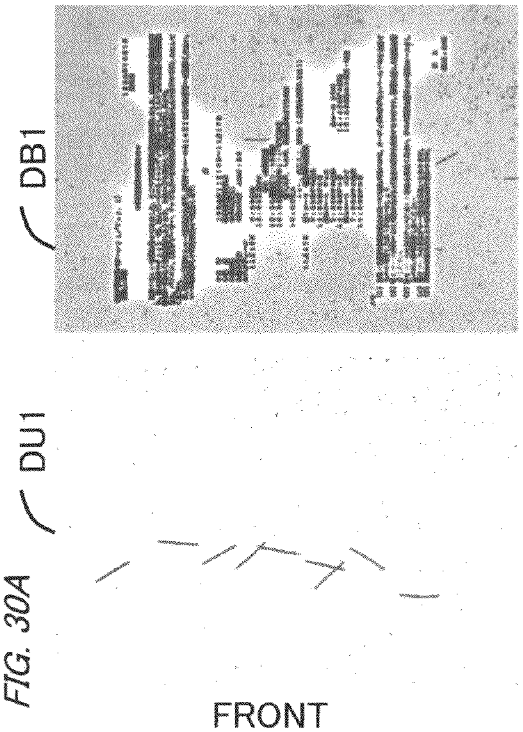

FIG. 30A shows images DU1 and DB2. The image DU1 was obtained by reading a printed material from a first surface of the printed material, wherein a visible image (CMY image) was formed only of CMY toners on the first surface. The image DB1 was obtained by reading a printed material from a first surface of a printed material, wherein a visible image (K image) was formed only of a K toner on the first surface. As can be understood from FIG. 30A, the visible image did not substantially appear but detectable substance images appeared clearly in the image DU1 read from the printed material on which only a CMY image was formed. In addition to the detectable substance images, several dotted noise images were detected but were not linear noise images similar to detectable substances. Therefore, the detected noise images were satisfactorily removed by the object extraction processing. On the other side, detectable substance images and a visible image formed on the printed material appeared mixed with each other, in the image DB1 read from a printed material on which only a K image was formed. The detectable substance images and the visible image were difficult to distinguish by image processings. A visible image expressing characters formed on the printed material overlaps the detectable substance images, and there was no large difference in brightness between the visible image and the detectable substance images.

Figure 30B:
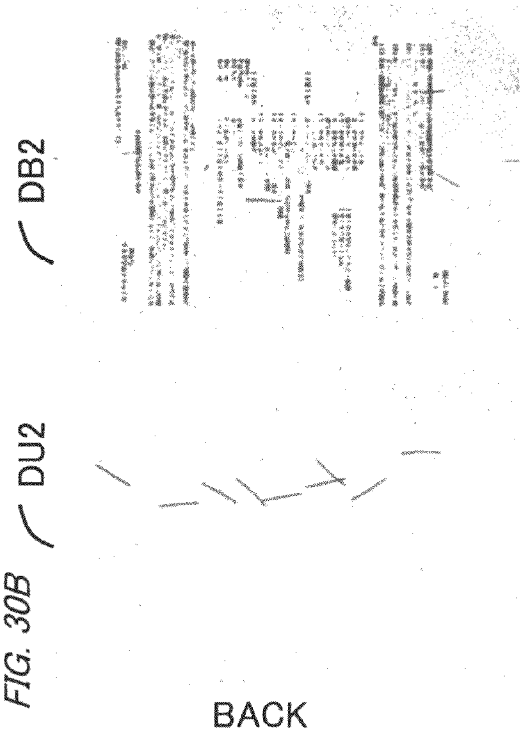

FIG. 30B shows images which were obtained by reading the same printed materials as described above from second surfaces, respectively. Also in this case, a visible image formed on the printed material did not substantially appear in the image DU2 read from the printed material on which only a CMY image was formed, as shown in FIG. 30B. On the other side, detectable substance images and a visible image formed on a printed material appeared mixed with each other, in the image DB2 read from a printed material on which only a K image was formed. There was only a small difference in brightness between the detectable substance images and the visible image, which were therefore difficult to distinguish by image processings.

FIGS. 30C and 30D show experimental results of carrying out a similar experiment to the foregoing experiment using inks instead of coloring materials. FIG. 30C shows images DU3 and DB3. The image DU3 was obtained by reading a printed material from a first surface of the printed material, wherein a visible image was formed only of C, M, and Y inks on the first surface. The image DB3 was obtained by reading a printed material from a first surface of the printed material, wherein a visible image was formed only of a black ink containing a carbon black on the first surface. FIG. 30D shows images DU4 and DB4, which were obtained by reading the same printed materials as described above from second surfaces, respectively.

Each of the C, M, and Y inks used in this experiment contained water, a pigment (coloring material) which is self-dispersible in water, a water-soluble organic solvent, a surfactant, and a high molecular compound. The pigment which is self-dispersible in water can be manufactured by subjecting a commonly used pigment to surface reforming treatment such as acid-basic treatment, coupling treatment, polymer graft treatment, plasma treatment, and/or oxidation/reduction treatment. A carbon black pigment was used for the black ink. Pigments which are respectively appropriate for cyan, magenta, and yellow colors were used for the cyan, magenta, and yellow inks. Used for the water-soluble organic solvent were polyvalent alcohols, derivatives of polyvalent alcohols, a nitrogen-containing solvent, alcohols, a sulfur-containing solvent, and/or propylene carbonate. A nonionic surfactant was used as the surfactant. The high polymer compound may be any of a nonionic compound, an anionic compound, a cationic compound, and an amphoteric compound.

As shown in FIGS. 30C and 30D, visible images formed on a paper sheet did not substantially appear in the images DU3 and DU4 respectively showing results of reading the first and second surfaces of a printed material on which images were formed only of C, M, and Y inks. Accordingly, the detectable substance images could clearly be visually checked. On the other side, visible images and detectable substance images are mixed with each other in the images DB3 and DB4 respectively showing the first and second surfaces of a printed material on which images were formed by using the black ink. There was no substantial difference in brightness between the visible images and detectable substance images, which were therefore found to be difficult to distinguish.

From the experimental results as described above, the inventors confirmed that a CMY image does not substantially appear but detectable substance images and a K image clearly appear in an image which the image read unit 320 reads from a printed material. That is, detectable substance images can be more easily extracted from an entire image read from a printed material on which no K image is formed, compared with a printed material in which a K image is formed. Also in case of using inks as coloring materials, an image formed of C, M, and Y inks does not substantially appear in a read image while an image formed of a black ink appears clearly.

E Modifications

The exemplary embodiments described above may be modified as follows. For example, the following modifications are available. The following modifications can be appropriately combined with each other in practical use.

In each of the exemplary embodiments described above, the comparison device 300 reads a printed material by emitting light in the infrared range (approximately 750 nm to 950 nm). This is because, as shown in FIG. 24, differences not smaller than a predetermined threshold exists between spectral reflection factors of CMY images and a spectral reflection factor of detectable substance images. More specifically, in the aforementioned wavelength range, spectral reflection factors of CMY images and a base material are greater than a spectral reflection factor of detectable substance images, respectively by predetermined thresholds or more. In an image which is read on the basis of the wavelength range, detectable substance images clearly appear and can be therefore easily extracted.

A wavelength range used for reading a printed material may be different from the wavelength range as described above if a difference not smaller than a predetermined threshold exists between the spectral reflection factor of detectable substances and that of the base material and if a difference which is not smaller than a predetermined threshold also exists between grey-scale values of pixels of detectable substance images and grey-scale values of pixels of the other images. Specifically, a lowest value capable of separating a CMY image and detectable substance images from each other is specified in advance as a threshold, based on experiments or calculations. Further, a printed material is read based on light in a wavelength range with which differences between spectral reflection factors of a visible image (CMY image) and the spectral reflection factor of detectable substances are not smaller than a threshold (e.g., Th1 shown in the figures). Meanwhile, a difference between the spectral reflection factor of a base material and the spectral reflection factor of detectable substances needs to be not smaller than a threshold (for example, Th2 shown in the figures).

Also in the above exemplary embodiments, if detectable substances are detected from a paper sheet, images are formed on the paper sheet by using only first coloring materials (CMY toners). The first coloring materials reflect light in a particular wavelength range, with an intensity which differs by a threshold or more from an intensity of light reflected on the detectable substances when the detectable substances are irradiated with the light in the particular wavelength range. On the other side, if no detectable substance is detected from a paper sheet, an image is formed on the paper sheet by using a second coloring material (K toner). The second coloring material reflects the light in the particular wavelength range with an intensity which differs by a difference smaller than the threshold from an intensity of light reflected on the detectable substances when the detectable substances are irradiated with the light in the particular wavelength range.

However, the exemplary embodiments are configured aiming for facilitating extraction of detectable substance images in case where detectable substances are detected from a paper sheet. Any coloring material can be used if no detectable substance is detected from a paper sheet. That is, only when detectable substances are detected from a paper sheet, an image on the paper sheet needs to be formed by using only coloring materials which reflect light in a particular wavelength range at a particular intensity. The intensity differs by a threshold or more from an intensity of light reflected on the detectable substances when the detectable substances are irradiated with the light in the particular wavelength range. Toners used for a paper sheet watermarked with detectable substances are not limited to the CMY toners. For example, toners of orange, blue, and/or other colors may be used insofar as an intensity of light reflected on detectable substances is not smaller than a threshold in a wavelength range (infrared range) which the image read unit 320 uses for reading images. In case of using a K toner or a black ink, a carbon black contained in the K toner or black ink adversely reduces an intensity of reflection light in the infrared range, so that detectable substances are difficult to extract. However, there is a case that a coloring material such as a dye can express black without containing a carbon black. In such a case, any coloring material can be used insofar as the coloring material reflects light in a particular wavelength range at an intensity which differs, by a difference not smaller than a threshold, from an intensity of light reflected by detectable substances.

Depending on the conditions, the image forming unit 250 may be configured so as to exclude the image forming engine for the K toner. For example, there can be a case that the registration device 200 is used to prepare important documents and only paper sheets containing detectable substances are set in advance. In this case, the registration device 200 does not form K images on the paper sheets, and an image forming engine for the K toner need not be provided. In this configuration, the registration device 200 omits the step Sd1 in FIG. 22 of determining whether detectable substances are included in a paper sheet or not, but executes processings of the steps Sd2 to Sd5, to form a visible image by using CMY toners.

Also in the exemplary embodiments, the registration device 200 determines whether or not a paper sheet is watermarked with detectable substances on the basis of an extraction result of the object extraction processing. A different method for detecting detectable substances may be different from a method of making such a determination. For example, the registration device 200 may be configured so that a magnetic sensor is provided in an upstream side of the image forming unit 250 along a direction of feeding paper sheets. The controller 210 may make a determination based on a detection result of the magnetic sensor. When registering a paper sheet, a user of the registration device 200 may be allowed to specify whether a paper sheet contains detectable substances or not by the manipulation unit 230.

Also in the exemplary embodiments, the infrared light source 321 of the comparison device 300 uses a LED light source which has spectral energy distribution as shown in FIG. 7. The infrared light source 321 is not limited to the LED light source but may be a semiconductor laser having spectral energy in a range of 700 nm to 1,000 nm. Otherwise, a tungsten halogen lamp whose spectral energy distribution reaches a visible light range may be used, and a near-infrared filter which allows only light in the infrared range to pass (or reduces an intensity of light outside the infrared range) may be provided between the light source and a printed material. In this case, the printed material is irradiated with only light in the infrared range which passes through the filter.

Further, light emitted from the infrared light source 321 needs to only contain a wavelength component in the infrared range and may also contain other wavelength components. In this case, the sensor 323 has an image pickup element which is sensitive only to the range approximately of 700 nm to 1,000 nm, and the image read unit 320 may generate image information on the basis of an intensity of light in this wavelength range.

Also in the exemplary embodiments described above, the registration device 200 and the comparison device 300 calculate feature amounts characterizing distribution of detectable substances. Calculations of feature amounts are not always required. The comparison device 300 may determine whether take-out of a printed material as a target of a comparison processing is allowed or not, depending on whether detectable substances are contained in a printed sheet or not. In this case, the registration device 200 and the comparison device 300 need not execute the "feature amount calculation processing", and a structure equivalent to the ID information storage unit 240 is therefore not required. More specifically in this case, the registration device 200 operates to form a visible image by using either CMY toners or CMYK toners depending on whether detectable substances are detected from a paper sheet or not. When the comparison device 300 makes a comparison, control is made so as not to allow take-out of a printed material if detectable substance images are extracted from image information generated by the image read unit 320.

In each of the exemplary embodiments, the image read unit 320 reads a paper sheet fed from a sheet feed tray, before toner images are transferred by the transfer units. However, the image read unit may be a stand-alone device such as a scanner. A user may set a paper sheet which the user wants to register, and operates the scanner to read the paper sheet. In this case, the user may stock paper sheets in the sheet feed tray of the registration device 200 after registration of the paper sheet.

Regarding the image read unit 220 of the registration device 200 and the image read unit 320 of the comparison device 300, the surface to be read from a paper sheet (or printed material) and the direction of reading the paper sheet vary depending on how the paper sheet is actually set by a user. More specifically, image information can be read from a paper sheet in a total number of four different ways, depending on whether the front or back surface of a paper sheet is read and whether a paper sheet is read in a direction from top to bottom of the paper sheet or vice versa. That is, if any part of the surface and the direction of a paper sheet to read is unspecified, the comparison device 300 cannot satisfactorily achieve an intended comparison unless all reading patterns available from the four different ways are taken into consideration. Next, how image information differs depending on the surface and the direction of a paper sheet to read will be described for each of the above exemplary embodiments, and related correction methods will also be described.

Figure 31:
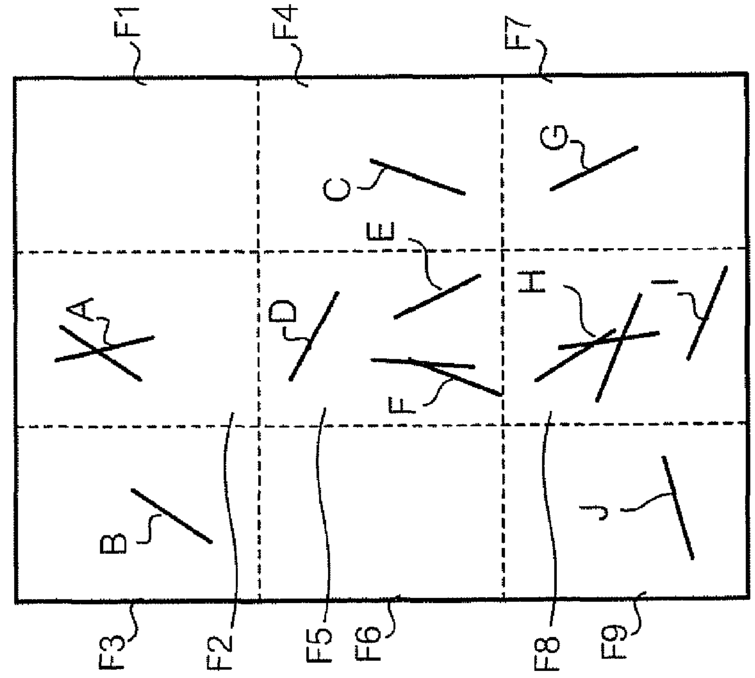
FIG. 31 shows an example of an image to which objects belong.

At first, in the first exemplary embodiment, a front surface of the paper sheet shown in FIG. 13 is read by the registration device 200. Then, division into divisional image areas F1 to F9 as shown in FIG. 16 is carried out, and further, classification into angular ranges R1 to R4 as shown in FIG. 19 is carried out. However, if an opposite surface of the same paper sheet is read with the longitudinal direction of the paper sheet oriented in the same direction as in the first exemplary embodiment, the detectable substance images shown in FIG. 16 and the image areas F1 to F9 are inverted laterally as shown in FIG. 31. FIG. 32 shows relationships of corresponding divisional image areas and angular ranges between cases of reading front and back surfaces of a paper sheet. Similarly, relationships of corresponding divisional image areas and angular ranges between cases of reading with the longitudinal direction of the paper sheet oriented in the opposite directions may be obtained in advance. The comparison device 300 may then perform a comparison processing in four different ways for each printed material, so that an intended comparison processing is achieved on the basis of the foregoing relationships, regardless of the surface and the direction to read the printed material.

In the second exemplary embodiment, the position of an origin stays unchanged regardless of which of the aforementioned four different ways is taken to read a paper sheet, provided that the center of image information is regarded as the origin. However, coordinate values $(\theta, \rho)$ in the Hough plane correspond to the position $(\pi-\theta, \rho)$ if opposite surfaces of a paper sheet are read with the longitudinal direction of the paper sheet oriented in the same direction. Otherwise, the coordinate values $(\theta, \rho)$ in the Hough plane correspond to the position $(\theta, -\rho)$ if one surface of a paper sheet is read twice with the longitudinal direction of the paper sheet oriented in opposite directions. Still otherwise, the coordinate values $(\theta, \rho)$ in the Hough plane correspond to the position $(\pi-\theta, -\rho)$ if opposite surfaces of a paper sheet are read with the longitudinal direction of the paper sheet oriented in opposite directions. That is, the comparison device 300 may carry out a comparison processing by comparing coordinates which are corrected on the bases of the foregoing relationships.

In the third exemplary embodiment, superimposed image information can be generated in four different ways depending on the surface and the direction in which a printed material is read. Therefore, the comparison processing may be carried out by calculating cross spectrums, based on comparative superimposed image information and image information obtained by rotating registered superimposed image information by 90 degrees.

In the exemplary embodiments, the image read units 220 and 320 each generate image information by reading one surface of a paper sheet. Alternatively, the image read units each may generate image information by reading two surfaces of a paper sheet. In this case, the image read unit 220 has the same structure as shown in FIG. 3 and reads one surface first. Thereafter, the paper sheet is reversed and fed so that the other surface is read. Still alternatively, the same light source and sensor as the light source 21 and the sensor 22 may be provided at positions opposing the light source 21 and the sensor 22 in relation to a paper sheet inserted in between. Two surfaces of the paper sheet can then be read simultaneously. In this case, the registration device 200 calculates and stores two sets of feature amounts respectively for front and back surfaces per paper sheet. Further, to allow the image read unit 320 to read two surfaces of a printed material, a configuration as follows may be employed. For example, the comparison device 300 is provided with a manual insertion tray. A printed material is set by a user and is fed from the manual insertion tray into the comparison device 300. A scanner having the same function as the image read unit 320 provided in the comparison device 300 reads two surfaces of the printed material and generates image information.

Also in the exemplary embodiments, the comparison device 300 calculates feature amounts and performs a comparison processing, based on image information which is read and generated by the image read unit 320. The comparison device 300 may alternatively be configured so as to perform the comparison processing, based on image information which is obtained from a device provided in an outside space. For example, the comparison device 300 is supposed to have a communication unit as an interface device for making communication via a network, and to be able to communicate with an external scanner provided in an outside space. If a printed material is read by the external scanner, the comparison device 300 obtains image information and performs a comparison processing. Even if a printed material for internal use only is taken out, the foregoing comparison processing enables the controller 310 to specify location of the printed material by identifying an external scanner used for reading the printed material. The controller 310 can further specify a paper sheet ID from feature amounts characterizing distribution of detectable substances contained in the printed material, and property information as shown in FIG. 5 can be therefore specified.

The external scanner is set near the door 400 in an outside space, and the comparison device 300 executes a comparison processing, based on an image read by the scanner. Further, the comparison device 300 refers to a field not shown, which is associated with property information and describes whether take-in is allowed or not. If take-in is allowed, the comparison device 300 outputs a control signal to the door open/close unit 401 so as to open the door 400. At this time, the comparison device 300 detects that a printed material which has been taken out is returned, and writes the return of the printed material into a file. Needless to say, if a printed material is taken out, the comparison device 300 writes the take-out of the printed material into the file.

In the exemplary embodiments, the controller 310 of the comparison device 300 specifies a paper sheet ID by a comparison processing, and then, outputs a control signal for controlling open/close of the door 400, depending on the content of the ID information management table 241. However, information concerning a comparison result which the controller 310 outputs is not limited to the control signal. For example, the comparison device 300 may refer to the property information table 242 shown in FIG. 5, and may output, to an external device not shown but set in an outside space, content written in fields associated with a specified paper sheet ID or information indicating that a printed material has been taken out. Alternatively, the comparison device 300 may be configured so as to instruct an image forming device not shown to print out such information. That is, insofar as the controller 310 outputs information depending on detectable substance images extracted from a printed material, content of the information is not limited to examples as described above.

Also in the exemplary embodiments, the registration device 200 performs processings relating to registration of a paper sheet, and the comparison device 300 performs processings relating to comparison of a printed material. However, all of these processings may be performed by one single device, or common processes to the processings of both devices may be shared by both devices. Otherwise, the processings of both devices may partially be performed by an external device.

In case where processings of the registration device 200 and the comparison device 300 are performed by one single device (hereinafter a "registration/comparison device"), a user makes a manipulation of commanding registration of a paper sheet, and the registration/comparison device then generates image information by reading the paper sheet (first recording medium) which is set on an image read device equivalent to the image read unit 220. Further, the registration/comparison device makes control for forming a visible image on the paper sheet by using only CMY toners or CMYK toners, depending on whether detectable substances are extracted from the paper sheet or not. On the other side, the registration/comparison device calculates feature amounts characterizing distribution of detectable substances, and stores the calculated feature amounts into the ID information storage unit. When the user makes a manipulation of commanding a comparison of a printed material, the registration/comparison device then causes an image read device equivalent to the image read unit 320 to read the printed material (second recording medium) and generate image information. Further, the registration/comparison device calculates feature amounts characterizing distribution of detectable substances, based on the image information. The registration/comparison device further reads and compares feature amounts stored in the ID information storage unit, with the calculated feature amounts, and outputs information concerning a comparison result. In this case, reading of a paper sheet which is carried out by the image read device equivalent to the image read unit 220 may be carried out by the image read device equivalent to the image read unit 320.

In the comparison system 100, functions of the image forming unit 250 in the registration device 200 may be performed by an image forming device as an external device. In this case, the registration device outputs color information for forming a visible image of CMY toners or CMYK toners through a communication interface not shown, and causes the image forming device to form the visible image on a paper sheet contained in the image forming device. At this time, the registration device obtains a detection result, for example, from a detection unit for detecting detectable substances, which is provided in the image forming device. Depending on the detection result, the registration device may determine whether color information for CMYK toners or CMYK toners should be generated.

Further, the ID information storage unit 240 may be included in the comparison device 300 or may be an external storage device.

The feature amount calculation program P2 and the feature amount calculation/comparison program P4 in the above exemplary embodiments can be provided, recorded in a recording medium such as a magnetic tape, a magnetic disk, a flexible disk, an optical recording medium, a magneto-optical recording medium, a CD (Compact Disk), a DVD (Digital Versatile Disk), or a RAM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principle of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:

a generating unit that generates image data on the basis of which an image forming unit forms a visible image on a recording medium containing detectable substances using only a coloring material having a spectral reflection factor that is different in a particular wavelength range from a spectral reflection factor that the detectable substances have by a predetermined threshold or more;

an output unit that outputs the image data generated by the generating unit to the image forming unit;

a calculating unit that calculates a feature amount characterizing distribution of the detectable substances contained in the recoding medium; and a memory that stores the feature amount calculated by the calculating unit, wherein the detectable substances are embedded within the recording medium such that they do not protrude surfaces of the recording medium, and the calculating unit:

obtains image information representing an image generated by reading the recording medium, extracts an image corresponding to the detectable substances from the obtained image information, and calculates, as the feature amount, on the basis of the extracted image corresponding to the detectable substances, numbers of detectable substances classified into angular ranges according to angles of predetermined extending directions of the detectable substances relative to the read surface of the recording medium.

2. The image processing device according to claim 1, wherein:

the particular wavelength range is an infrared range; and the coloring material is a combination of cyan, magenta, and a yellow coloring material.

3. The image processing device according to claim 1, wherein:

the particular wavelength range is an infrared range; and the coloring material is a combination of cyan, magenta, and a yellow coloring material.

4. An image forming device comprising:

the image processing device according to claim 1; and the image forming unit.

5. An image forming device comprising:

the image processing device according to claim 1; and the image forming unit.

6. The image forming device according to claim 4, further comprising a detecting unit that detects the detectable substances contained in the recording medium, wherein the image forming unit forms a visible image on the recording medium using only the coloring material, if the detectable substances are detected by the detecting unit.

7. The image forming device according to claim 4, further comprising a detecting unit that detects detectable substances contained in a recording medium, wherein the image forming unit comprises:

a first image forming unit that, if detectable substances are detected by the detecting unit in a recording medium, forms a visible image on the recording medium using only a first coloring material having a spectral reflection factor that is different in a particular wavelength range from a spectral reflection factor that the detected detectable substances have by a predetermined threshold or more; and a second image forming unit that, if detectable substances are not detected by the detection unit in a recording medium, forms a visible image on the recording medium using second coloring material having a spectral reflection factor that is different in a particular wavelength range from a spectral reflection factor that the detected detectable substances have by less than the predetermined threshold.

8. The image forming device according to claim 7, wherein:

the first coloring material is a combination of cyan, magenta, and a yellow coloring material;

the first image forming unit forms a black image using the first coloring material;

the second coloring material is a black coloring material; and the second image forming unit forms a black image using the second coloring material.

9. An image processing method comprising:

generating of image data on the basis of which an image forming unit forms a visible image on a recording medium containing detectable substances using only a coloring material having a spectral reflection factor that is different in a particular wavelength range from a spectral reflection factor that the detectable substances have by a predetermined threshold or more;

outputting the image data to the image forming unit;

calculating a feature amount characterizing distribution of the detectable substances contained in the recoding medium: and storing the calculated feature amount, wherein the detectable substances are embedded within the recording medium such that they do not protrude surfaces of the recording medium, and the calculating includes:

obtaining image information representing an image generated by reading the recording medium, extracting an image corresponding to the detectable substances from the obtained image information, and calculating, as the feature amount, on the basis of the extracted image corresponding to the detectable substances, numbers of detectable substances classified into angular ranges according to angles of predetermined extending directions of the detectable substances relative to the read surface of the recording medium.

10. A non-transitory computer readable medium storing a program causing a computer to execute a process for an image processing, the process comprising:

generating of image data on the basis of which an image forming unit forms a visible image on a recording medium containing detectable substances using only a coloring material having a spectral reflection factor that is different in a particular wavelength range from a spectral reflection factor that the detectable substances have by a predetermined threshold or more;

outputting the image data to the image forming unit;

calculating a feature amount characterizing distribution of the detectable substances contained in the recoding medium; and storing the calculated feature amount, wherein the detectable substances are embedded within the recording medium such that they do not protrude surfaces of the recording medium, and the calculating includes:

obtaining image information representing an image generated by reading the recording medium, extracting an image corresponding to the detectable substances from the obtained image information, and calculating, as the feature amount, on the basis of the extracted image corresponding to the detectable substances, numbers of detectable substances classified into angular ranges according to angles of predetermined extending directions of the detectable substances relative to the read surface of the recording medium.

11. The image processing device according to claim 1, wherein the detectable substances are formed of a metal.

12. The image processing device according to claim 1, wherein a diameter of the detectable substances is smaller than a thickness of the recording medium.

13. The image processing device according to claim 1, wherein the calculating unit further calculates, as the feature amount, on the basis of the extracted image corresponding to the detectable substances, a number of detectable substances which appear as overlapping one another in the recording medium when viewed from a direction vertical to a read surface of the recording medium.

14. The image forming device according to claim 4, wherein the image forming unit forms a visible image on a recording medium containing detectable substances using only a coloring material having a spectral reflection factor that is different in a particular wavelength range from a spectral reflection factor that the detectable substances have by a predetermined threshold or more.

* * * * *